US005600834A

United States Patent [19]

Howard

[11] Patent Number: 5,600,834

[45] Date of Patent: Feb. 4, 1997

[54] METHOD AND APPARATUS FOR RECONCILING DIFFERENT VERSIONS OF A FILE

[75] Inventor: John H. Howard, Cambridge, Mass.

[73] Assignee: Mitsubishi Electric Information Technology Center America, Inc., Cambridge, Mass.

[21] Appl. No.: 417,446

[22] Filed: Apr. 5, 1995

Related U.S. Application Data

[63] Continuation of Ser. No. 61,674, May 14, 1993, abandoned.

[51] Int. Cl.[6] .............................. G06F 15/00; G06F 7/00

[52] U.S. Cl. ............... 395/617; 395/200.08; 395/200.19; 364/DIG. 1; 364/282.1; 364/281.5; 364/282.4

[58] Field of Search .............................. 395/600, 200.08, 395/200.19; 364/DIG. 1

[56] References Cited

U.S. PATENT DOCUMENTS

| | | | |
|---|---|---|---|
| 4,077,059 | 2/1978 | Cordi et al. | 364/200 |
| 4,408,273 | 10/1983 | Plow | 364/200 |
| 4,819,156 | 4/1989 | Delorme et al. | 364/200 |
| 4,823,310 | 4/1989 | Grand | 364/900 |
| 4,875,159 | 10/1989 | Cary et al. | 364/200 |
| 4,914,654 | 4/1990 | Matsuda et al. | 370/94.1 |
| 5,151,988 | 9/1992 | Yamagishi | 395/600 |
| 5,155,849 | 10/1992 | Westfall et al. | 395/600 |
| 5,212,788 | 5/1993 | Lomet et al. | 395/600 |
| 5,247,684 | 9/1993 | Tavares et al. | 395/700 |
| 5,261,094 | 11/1993 | Everson et al. | 395/600 |
| 5,263,155 | 11/1993 | Wang | 395/600 |
| 5,357,631 | 10/1994 | Howell | 395/600 |
| 5,388,255 | 2/1995 | Pytlik et al. | 395/600 |

*Primary Examiner*—Wayne Amsbury
*Assistant Examiner*—Jean R. Homere
*Attorney, Agent, or Firm*—Robert K. Tendler, Esq.

[57] ABSTRACT

In a distributed file environment, a system for safely updating a file without risk of losing work performed at one site due to work performed on the file at another site uses a journal or log at each site which is updated after a file is modified. This log is compared with the logs from other sites before a file is used at any one site, so that new versions can be propogated automatically and safely to out-of-date sites, with the user immediately alerted if conflicting versions of the file exist at different sites. The reconciliation can be applied to collections of files, automatically updating only those files for which it is safe to and necessary do so. Since reconciliation occurs at times selected by the user, inconsistent or partially completed versions of files need not be propogated to other sites. Additionally, logs may be built incrementally by occasionally observing the state of the systems in terms of the files and their time stamps and creating additional log entries reflecting appearance, disappearance and changes of files. Furthermore, logs may be purged of obsolete entries by including additional log entries indicating the most recent time each site has participated in a reconciliation and deleting obsolete entries that all sites have seen.

4 Claims, 5 Drawing Sheets

|  | OPERATION | FILE | TIMESTOP | SITE HOME | OFFICE |
|---|---|---|---|---|---|
| JOURNAL | CREATE | A | 4/19/93 10:22 | ✓ | ✓ |
|  | UPDATE | A | 4/20/93 8:30 | ✓ | ✓ |

UPDATE NEEDED : COPY FROM HOME TO WORK

| CREATE | A | 4/19/93 10:22 | ✓ | ✓ |
|---|---|---|---|---|
| UPDATE | A | 4/20/93 8:30 | ✓ ———→ | ○ |

DELETE NEEDED : DELETE COPY AT WORK

| CREATE | B | 4/19/93 10:35 | ✓ | ✓ |
|---|---|---|---|---|
| DELETE | B | 4/20/93 8:15 | ○ ←——— | ✓ |

CONFLICT DETECTED

| CREATE | C | 4/19/93 10:35 | ✓ | ✓ |
|---|---|---|---|---|
| UPDATE | C | 4/19/93 11:00 | ○ | ✓ |
| UPDATE | C | 4/20/93 8:30 | ✓ | ○ |

METHOD AND APPARATUS FOR RECONCILING DIFFERENT VERSIONS OF A FILE

This is a continuation of application Ser. No. 08/061,674 filed on May 14, 1993, now abandoned.

FIELD OF INVENTION

This invention relates to distributed file systems and more particularly to a method and system for reconciling different versions of files, in which the files are stored in computers at two or more separate locations or sites.

BACKGROUND OF THE INVENTION

There is a problem, especially with the portability of computers and floppy disks that a given file, for instance, in a lap top may not reflect the same information or data as the same file at a desktop or fixed work station.

This is because work is frequently taken from location to location. As frequently happens, a file created at a fixed work station at the office may be modified at a remote location, such as one's home, by merely transporting a disk or diskette containing the file and modifying it at the remote location. Multiple versions of the same file can also exist in distributed networks when files are modified or manipulated by multiple users.

Problems thus arise when the versions of the file at two sites, such as home and office, do not agree because they have not been identically updated. This can occur by accident when one forgets to transport a floppy disk from one location to the other; or when one forgets to load the disk altogether.

It is of course desirable to have some synchronization between versions of the same file when created or modified at two different sites. For instance, it is possible to have the same version of a file at two sites and only access one at a time. When, however, versions of a file are created at two sites, it is important to be able to update or reconcile the files at both sites so as to appropriately update both files, or only one file.

In the past, systems have compared the times that a file was updated at different sites, have automatically selected the most recent version, and have copied this version into the appropriate file at both sites. Such systems include the Novell, Netware, Sun Microsystems Network File System (NSF) and Andrew File Systems. All of these systems have problems with their automatic updating procedures.

It is also a feature of NFS, Andrew File System, and, Netware that they automatically alter files immediately after they are modified. This results in significant performance problems as new versions of files are transmitted. Moreover all updates are distributed throughout the network, exposing raw work product to all on the system. It can also be an embarrassment because of the automation process, where those connected to the distributed system immediately have knowledge of new unedited data and changes.

It will of course be appreciated that when there are multiple users or contributors to a single file, such as in writing software, or as in editing documents, it is very important to alert all users of the same file as to what others are doing so that at some point there is control in each of the users as to what updating or reconciling of multiple versions of the file will be permitted. It is particularly annoying for the writer of software to have someone else edit his software without his knowledge. Likewise, it is equally unfortunate for the word processing public to have one user edit a work without giving adequate notice to the other user.

More specifically, an inadequate solution to the problem of multiple versions of the file at different locations exists in distributed file system technology as represented by the NFS, Andrew, Apple Share, Novell, and Research Systems software such as Coda and Ficus. All of these systems give the impression of being a single global file system. The advantages of having a single global file system are automatic updating, sharing, and familiar time sharing systems semantics. However, the problems with such systems are that they fail or degrade when disconnected, are unpredictable in performance, are unacceptable in that updates are at the system's convenience and not at the user's, and that they require a modified operating system, often requiring a single vendor.

Another inadequate solution to the problem of multiple revisions of a file is found in the explicit file transfer technology associated with diskette/tape, E-mail, Lap-Link and file transfer protocols. What these systems attempt to do is copy files and carry or mail them. While the advantages are complete user control, flexible transport, and conversion between different systems, the disadvantages include complicated and error-prone protocols, in which overwriting of useful data can occur accidentally and in which there are no "merges" of different versions.

In all these systems, the most recent version of the file in one computer is automatically copied to the other. Thus, current programs seek to establish which file is correct by date and time, a technique called "time stamping". However, these types of systems are far from failsafe. For instance, assuming one wishes to delete a file on a lap top, deleting the file at the lap top may not result in deleting the file at the fixed work station, but rather in restoration of the obsolete file found at the work station. Thus automatic reconciling systems are error-prone.

More generally, if some work is to be accomplished on a file in more than one place, then it is possible that neither supercedes the other. Time stamp based reconciliation thus will possibly result in over-writing relevant information. As a result, user's work embodied in the older version may be lost without any warning. It is also possible that this will only happen when one forgets to hook up the computers for the reconciliation between versions of the file.

What is important is to know when a file has been edited in two places, what has been done, whether or not to authorize a merge of the two versions, and on what basis. It is therefore important to devise a system by which a merge is done in a safe way. It is also important to provide a system in which conflicts are recognized, with the conflict not necessarily being resolved automatically, but rather at the option of an individual operator who has been alerted to the fact of a conflict.

Note that one prior art way of determining a conflict is the so-called "journaling" technique which is to keep a record of what has transpired at one central location. Using a single centralized computer, a forward log or journal type of reconciliation may be accomplished.

SUMMARY OF THE INVENTION

However, rather than keeping a centralized journal, it is a feature of the present invention that each computer or system keep its own journal. The journal, which is a history of file versions, indicates the file which is edited and its date/time stamp. Optionally the journal may also keep a detail of the type of editing that was involved should a conflict be determined.

For reconciliation, if the files are the same and the journals agree, there is no conflict.

On the other hand, when one works on one computer but not the other, and the resulting files are subsequently to be merged together, the Subject System first compares the two journals to see if one has more journal entries in one than the other. Note the comparison may be facilitated by in a merge operation. Once having determined that there are differences in some of the journal entries, then the system automatically copies those files for which the journal indicates no conflict, and alerts the user so that actions can be taken to resolve any conflict found.

Different versions of the same file are thus reconciled by each computer maintaining its own journal and by the comparison of the two journals at times specified by the user, with the reconciling system automatically updating file revisions when appropriate, or providing the user with an indication that such automatic updating is inappropriate.

Specifically, the Subject System can be configured to either delete a file which has been determined to be the non-desired file, or to copy the most recent file, in a replacing operation, into the computer which does not have the most recent file. At some point the journals of both of the computers will be in synchronization. Thereafter if no journals change, there need be no indication made to the user that a conflict exists. If one of the journals changes at only one site, then it is possible to simply instruct the machine at the other site on command to do the same actions. However, if both journals are changed, it is very important to alert the user that a conflict cannot be resolved.

Note, in the Subject Invention, not only does reconciling include the concept of copying or deleting, one can increase the level of detail of the individual entries in the logs that are filed to alert the user that a simple merge/purge performed on a time stamp basis will not work. For example, if the user is warned, the user may run a program called DIFF which highlights the differences between the two files. At that point, the user may decide which of the two files he prefers or which changes should be made in what file.

Thus, in the Subject Invention, in a distributed file system, instead of giving the user the impression that there is only one set of files, the system provides user with the impression that there are different versions of a file which must be occasionally reconciled, although only at the convenience of the user. The Subject System solves the problem of multiple versions of the same file by reconciling on demand. Each computer has a local version of the same data, reconciled by comparing journals of local changes, with user intervention being called into play if conflicting changes are discovered.

Applications for the subject reconciling system include file cataloging and reconciliation, office applications and database management systems. Hardware can involve organizers, palm tops, pen based tablets and notebooks.

Further applications of the Subject System include merging records within files. Moreover, it is possible to batch update by exchanging journals.

It is an important feature of the subject invention that the reconciliation may be invoked under user or application control, either at the beginning or end of a working session or overnight, for instance.

In summary, in a distributed file environment, a system for safely updating a file without risk of losing work performed at one site due to work performed on the file at another site includes maintaining a journal or log at each site which is updated after a file is modified. This journal is compared with the logs from other sites before a file is used at any one site, so that new versions can be propogated automatically and safely to out-of-date sites, with the user immediately alerted if conflicting versions of the file exist at different sites. Different versions of the same file are thus reconciled by each computer maintaining its own journal and by the comparison of the two journals at times specified by the user, with the reconciling system automatically updating file revisions when appropriate, or providing the user with an indication that such automatic updating is inappropriate. The reconciliation can be applied to collections of files, automatically updating only those files for which it is safe to and necessary do so. Since reconciliation occurs at times selected by the user, inconsistent or partially completed versions of files need not be propogated to other sites. Additionally, logs may be built incrementally by occasionally observing the state of the systems in terms of the files and their time stamps and creating additional log entries reflecting appearance, disappearance and changes of files. Furthermore, logs may be purged of obsolete entries by including additional log entries indicating the most recent time each site has participated in a reconciliation and deleting obsolete entries that all sites have seen.

BRIEF DESCRIPTION OF THE DRAWINGS

These and other features of the Subject Invention will be better understood taken in conjunction with the detailed description in conjunction with the drawings of which.

DETAILED DESCRIPTION

Figure 1:
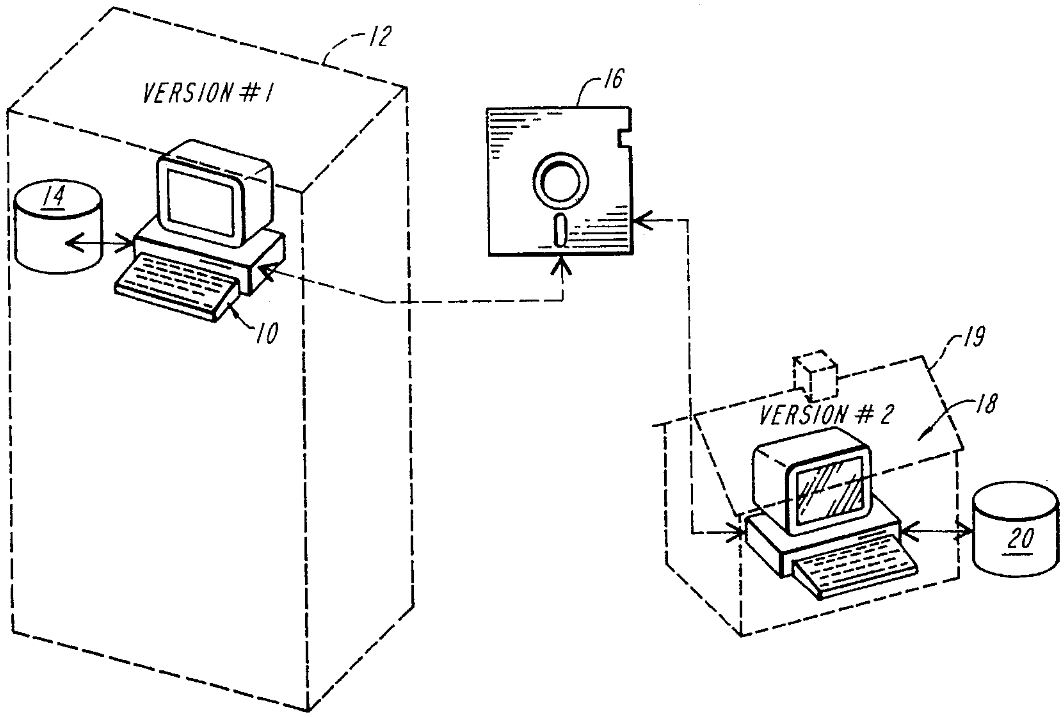
FIG. 1 is a diagrammatic representation of the transfer of versions of a file from an office computer to a remote location, for instance, in the home.

Referring now to FIG. 1, in a typical operational setting, Version #1 of a file may be created at a fixed terminal 10 at an office 12 in which the version created at terminal 10 is stored in a storage device 14. The information in this file may be transferred as via a floppy diskette 16 to a computer 18 at a home site 19, with the file being modifiable so as to produce a Version #2 which is stored in a storage device 20.

Figure 2:
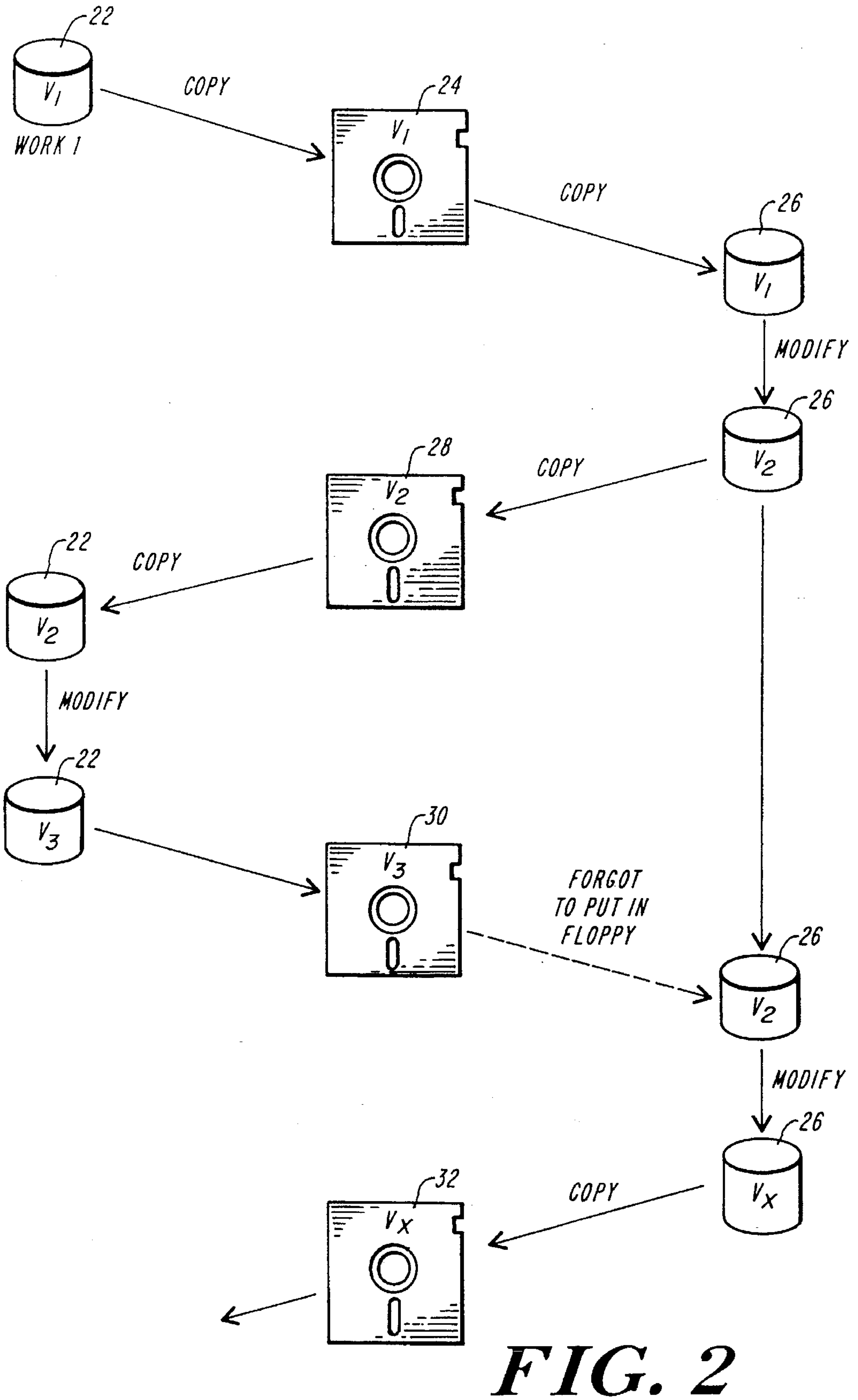
FIG. 2 is a diagrammatic representation of the problem of generating two different versions of the same file through the modification of the file at two different locations.

Referring now to FIG. 2, it will be seen how it is possible to modify files at two different sites or locations such that work performed in the file may not necessarily be on the most recently updated file. As can be seen, Work 1 in storage device 22 contains the Version #1 which is copied onto a diskette 24 that is then copied into storage device 26 at a remote site or location. The information in storage device 26 may be modified so as to produce a Version #2 at 26 which is then copied, for instance, onto a diskette 28 that is copied into storage device 22 at the first site as Version #2. This version may be further modified and placed in storage as Version #3. Thereafter this version may be copied onto diskette 30 which is intended to be downloaded to storage device 26. However in the process either the disk is lost or not downloaded, at which point the modification as illustrated at $V_x$ is copied onto a diskette 32. It will be appreciated that there is now a problem in that Version #3 is different than Version $V_x$, which was created by modifying Versions $V_2$ as opposed to Version $V_3$. This creates an error which is difficult to rectify and may be unnoticed.

The problem, of course, is that these are two versions of the same file. The first version will be Version Three and the second version will be Version X. Merely updating one of the computers with one version or the other will not solve the problem of reconciliation, because Version X does not have the updates of Version Three. Thus it is impossible to automatically update either of the versions at either of the different locations; and it is for this reason that time stamp based systems for reconciliation fail.

Thus, in terms of a typical scenario, considering the case of writing a book using personal computers at office and home, carrying files back and forth on a diskette, the normal procedure is to copy all the working files from the diskette to the computer about to be used, edit one or more chapters, and copy the edited files back to the diskette when done.

As a result one has three different copies of the files, one stored in the office computer, one at home, and one on the diskette. Even though there are really three copies, one thinks of them as being different versions of the same files.

If one forgets to copy the files edited at the office, one can then go home with an out-of-date diskette. The diskette carried home is then copied to the home computer and editing continues, not noticing that one is starting with stale information. The next day the updated files are copied back to the office computer, losing the previous work.

There are some things one can do to help protect against this common error. For example, some file copying programs have an option to check dates and refuse to replace a newer version of a file with an older one. This helps considerably, but is not perfect. It does not detect the error described above, for example, since the versions of the files edited at home in the evening do have a later date than the versions edited yesterday at work. It also fails to handle the case of deleting obsolete files.

Figure 3:
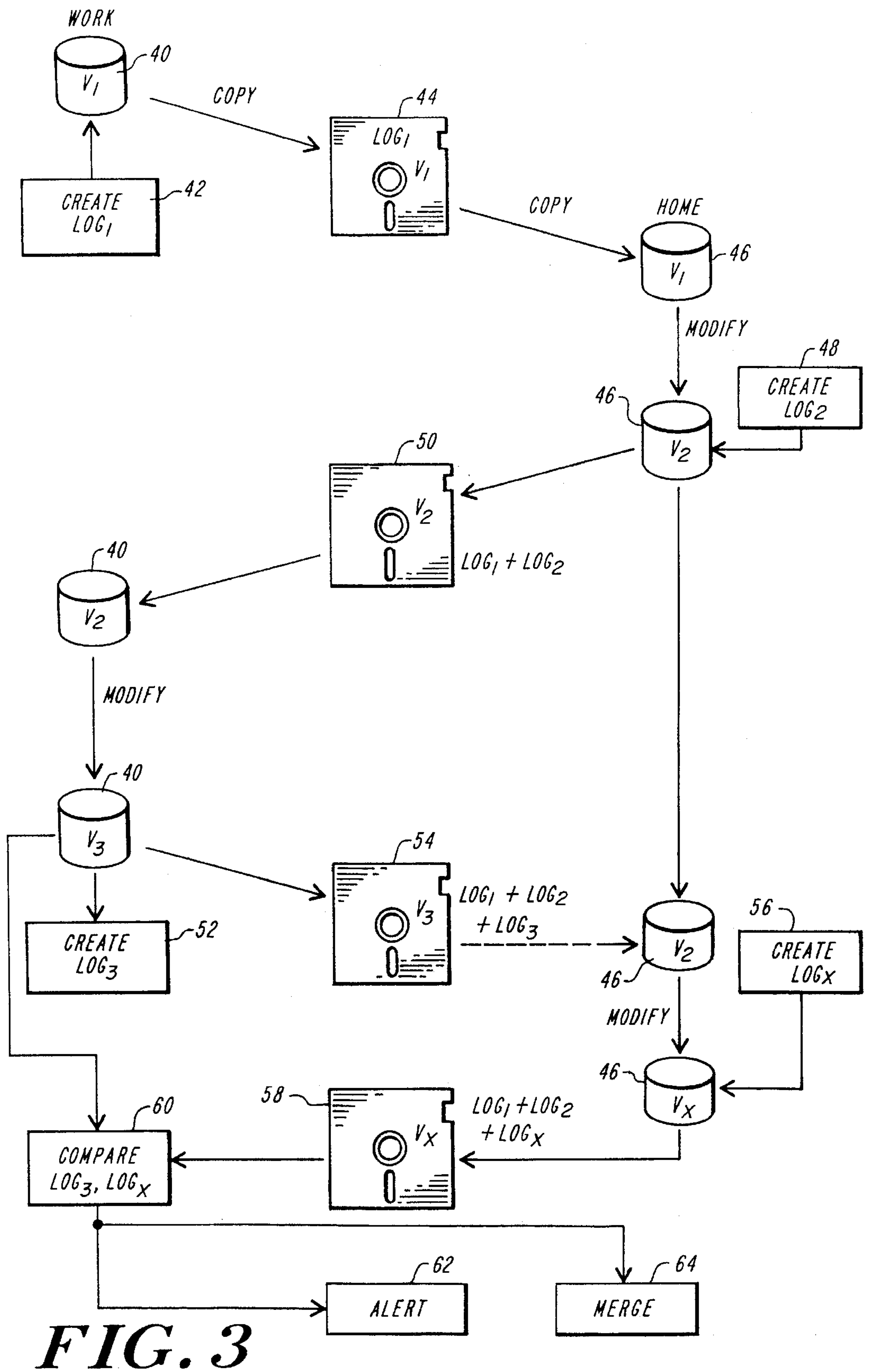
FIG. 3 is a diagrammatic representation of a method for reconciling versions of a file including the creation of logs at various sites and the comparison of the logs prior to permitting either automatic updating or manual updating when a comparison between the logs indicates a discrepancy.

Referring now to FIG. 3, the subject file reconciling system solves the above problems by embedding a program called RECONCILE in a system which detects conflicting updates, so one can use it to update files safely. The system will replace a file with a later version only if it is sure that the later version was derived from the one being replaced. If the file to be replaced is not an earlier version, the system will report an error so that one can resolve the conflict.

More specifically, assuming that a Version #1 of a file is stored at a storage device 40, the Subject System creates a log, $Log_1$ here illustrated at 42. When Version $V_1$ is copied onto a diskette 44, $Log_1$ also appears on the diskette. This diskette may then be loaded into a storage device 46 at a remote location, where the Version #1 storage may be modified to produce Version #2, which is again stored at storage device 46. Concommitant with the modification of Version #1 to Version #2, a further log is created, $Log_2$ as illustrated at 48. When this file is to be transferred to the work location, it is downloaded to a diskette 50 which contains not only Version $V_2$, it also contains $Log_1$+$Log_2$, as illustrated. This is downloaded back to storage device 40 at the original work location which may be modified as illustrated by Version $V_3$ again stored at storage device 40. Upon modification of the $V_2$ version, the system creates an additional log, $Log_3$ as illustrated at 52.

Again, when this version of the file is to be transferred to the remote location, it is downloaded to a diskette 54 which then contains not only Version $V_3$, but also $Log_1$+$Log_2$+$Log_3$. This diskette, however, in the example given is not downloaded to storage device 46. Rather, as inadvertently sometimes happens, $V_2$ is modified to produce Version $V_x$. At the same time that $V_x$ is formed, a log, $Log_x$, is created as illustrated at 56. Version $V_x$ may ultimately be transferred to a diskette 58. This diskette will have Version $V_x$ downloaded to it plus $Log_1$+$Log_2$+$Log_x$. If diskette 58 is then to be loaded back into the storage device 40, upon accessing of this file a unit 60 compares the logs previously generated at the work site, with the logs associated with diskette 58 which has been loaded at the worksite. The result of the comparison step is either to alert the operator at 62 to a difference in the logs for this file which will not permit automatic updating, or permit automatic updating as indicated by merge 64.

This being the case, a system is provided through the comparison of logs to either permit automatic updating or to alert the user that automatic updating is inappropriate.

In the scenario of FIG. 3, neither the office nor the evening versions of the files were derived from the other, so RECONCILE will prevent the system from overwriting them. Note the versions were both derived from the same earlier version, but not from each other.

The system knows when one version of a file was derived from another by keeping a history of past versions of files. If one history indicates that a file has gone through Versions #1, 2 and 3 while the other has only Version #1 and 2, it is safe to copy Version #3. But if one history shows Versions #1, 2 and 3 while the other shows Versions #1, 2 and 4, there is a conflict since neither Version #3 nor Version #4 was derived from the other.

Figure 4:
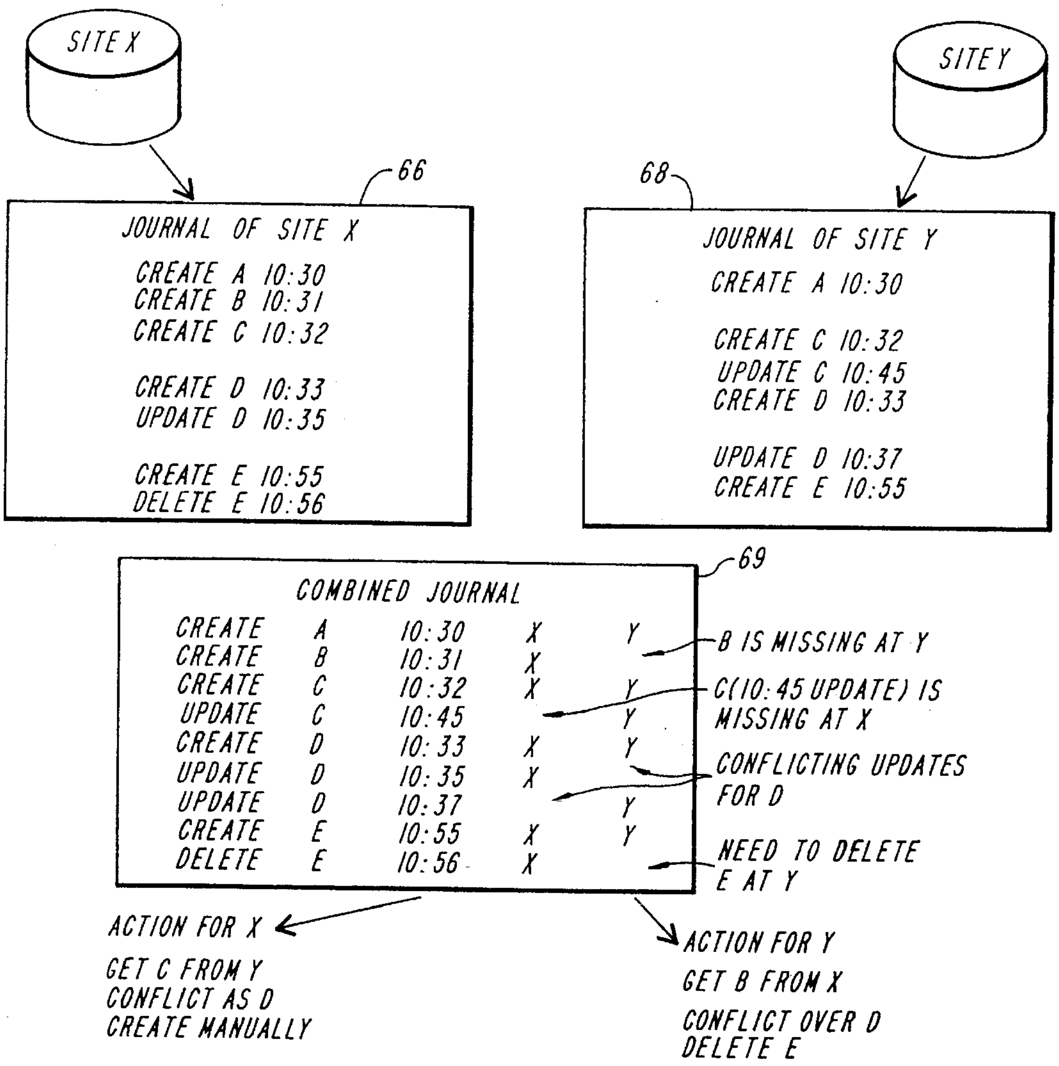
FIG. 4 is a block diagram illustrating the generation of journals at two sites, forming a combined journal, detecting a conflict, and providing actions based on conflict resolution.
Figure 5:
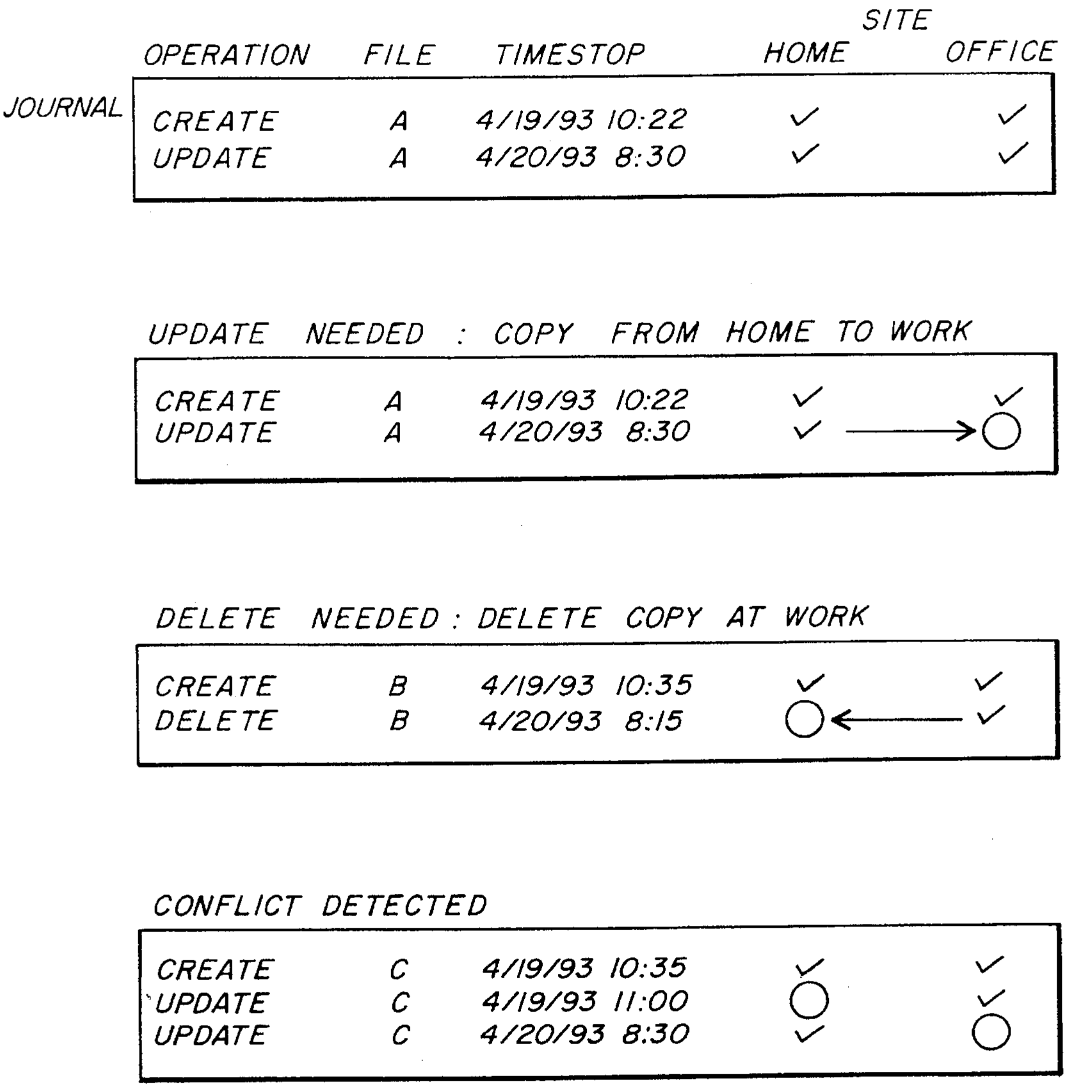
FIG. 5 is a series of diagrams indicating journals and situations where no update is needed, an update is needed, a delete is needed, or a conflict is to be indicated.

More specifically, FIG. 4 shows how two journals are reconciled. Starting with the two separate journals, for Sites X and Y, here illustrated at 66 and 68 respectively, each journal or log contains entries describing the history of five files, named A, B, C, D and E. In addition to the file name, the journal entries indicate the action which was taken, either Create, Update or Delete, and the time which that action was taken, at that particular site. For example, the journal of Site X shows that file E was created at 10:55 and deleted at 10:56. Note, only times are shown for convenience, since the log typically indicates both time and date.

Note that the journals are ordered by file name: A, B, C, D and E; and by timestamp for the same file name. Journals are combined by merging them according to this rule: Identical entries (including the action taken) are combined into a single entry during the merge. The combined journal as illustrated at 70 also records which sites had each entry. This could be X, Y, or both X and Y. For example, the combined journal shows that E was created at 10:55 known to both X and Y, and deleted at 10:56, known only to Site X.

The goal of reconciliation is to bring the individual journals up to date by performing missing actions. Thus, in FIG. 4, the missing creation of file B at Site Y can be fixed by copying file B from Site X to Site Y. The missing update of C at X can similarly be fixed by copying C from Site Y. In the case of file E, the missing action is a deletion, which can be corrected by deleting the copy of file E at Site Y. As these reconciliation actions are taken, the missing journal entries are filled in and the individual journals updated.

There is a conflict in the case of file D. Both sites agree that the file was originally created at 10:33, but they show independent updates occurring at different times, and neither site knows about the other site's update. The automatic reconciliation procedure reports this conflict rather than replacing either version, leaving it up to the user to perform whatever correction or merge of the individual files is necessary.

By way of further description, the following definitions are useful in understanding the Subject Invention.

For purposes of this invention, a file is a body of closely related information stored in a computer. Typical examples of files would be documents edited with a word processor, or spreadsheets, or messages. Each individual memorandum, letter, or book chapter is kept in its own file. In addition to its contents, a file has a name and a timestamp. The name identifies the file in general and the timestamp indicates when the file was created or changed. As time passes, a file with the same name will have different versions, which can be distinguished by their different timestamps.

A directory is defined as a collection of files. Usually the files in a directory have some loose relationship, for example that they are all part of some larger body of information like the chapters in a book; or that they were created by the same person, relate to the same topic, or are owned by the same organization. Directories also have names, and may also have timestamps, although directory timestamps are not very useful.

Most computer systems allow files and directories to be arranged in a hierarchy or tree, which means that directories can contain subdirectories. An advantage of subdirectories is that more closely related files can be grouped together. To find a file one works one's way into the successive subdirectories until the desired file is reached.

A working session is defined as a period of work on a single computer. During the course of a working session, files may be in an incomplete or inconsistent state. One ordinarily doesn't want to make a permanent record of these files or to send copies elsewhere. Usually one tries to finish a day's work by cleaning up the inconsistencies before ending the working session, although occasionally a session may last several days. Note, a session can be anything one chooses. It is, however, important to note that one doesn't use RECONCILE to copy files during a working session, but only at the beginning and/or end.

A site is a specific storage location for a directory hierarchy. As understood herein, several sites are considered as all containing versions of the same directory hierarchy. These versions may be the same or different. The basic purpose of the Subject System is to combine hierarchies at different sites, making them all the same by safely updating versions of individual files.

One should not think of a site as being the total disk storage on any one computer. Usually a site would contain a number of unrelated hierarchies defined according the user's convenience. A personal computer, for example, might contain separate hierarchies for system software, installed applications, and one or more individuals' working files. While actual systems often glue these into a single super-hierarchy, it is easier to think of them as being separate.

A site may also be nothing more than a diskette. In fact, the way one copies files to and from the diskette in the above scenario is to reconcile the diskette version with the computer at home or office that one is copying to or from. At the beginning of a working session, the Subject System will detect newer files on the diskette and copy them to the computer. At the end of the session, the Subject System will detect newer files on the computer and copy them to the diskette.

By way of definition, a journal is a history of file versions. To do its work, the Subject System creates a journal for each site, merges them to look for missing versions, and either updates by copying more recent non-conflicting versions, or else reports errors if there are conflicts.

As with database journals, the journals used by the Subject System contain not only names and timestamps but also actions. For this system these are very simple: either "update" or "delete", which can be inferred from the fact that a previously-present file has disappeared.

Including deletion operations in journals means that reconcile can safely propagate deletions to other sites, again checking for conflicts.

There are actually two kinds of journals: internal and external. An internal journal is stored as a special file within the directory it describes. In each hierarchy, each directory has its own internal journal. An external journal contains the same information, but has been extracted into a separate file, and stored somewhere else. Although this system can use both kinds, it can only update to or from internal journals. External journals may be used as sources of information about necessary updates, but the actual files and directories involved are not directly accessible.

One implementation of the Subject System is described in the version of RECONCILE attached hereto as Appendix A.

The simplest and standard way to use RECONCILE is to apply it to several directly accessible sites such as mounted disks or diskettes. For example the command reconcile . a:\ would reconcile the current working directory (named "." in most systems) with the diskette in drive A. The order of the two parameters doesn't matter. In this scenario, RECONCILE would be run when one begins using either the office or the home computer, and again at the end. So long as one never forgets to do this, all updating is automatic. One can even delete obsolete files without having them "come back" at the other computer.

Suppose one does happen to forget to reconcile at the beginning or end of a session, and one then updates some file. The next time one reconciles with the two conflicting versions of the file, one will obtain the error message:

reconcile: Conflicting Versions, ./oops and a:oops

At this point the two users should consult their memories of what the conflicting updates were, or use a tool such as diff to find and display the differences between the two versions. One now edits one or the other to merge changes, if necessary. Finally, the resulting good version of the file is copied to the other site, replacing the bad version there, usually a copy program which copies the timestamp as well as the contents. This will leave a record of the conflict in the journals, but since there is a more recent, non-conflicting version at both sites, RECONCILE will not indicate any conflict.

In one embodiment, the Subject System builds journals by comparing the actual directories with the previous versions of its own journals each time it is run. This means that it makes sense to run RECONCILE even for a single site:

reconcile .

This updates the internal journal of the current working directory. If one makes several successive versions of a file, RECONCILE will only see the last one since the last time it was run. This can actually be an advantage since the other versions are of no particular significance as long as they are not transmitted to any other site.

One can choose how often one wants to run RECONCILE. Even if one forgets to run RECONCILE at the end of a working session, one will not lose anything permanently. The cost of forgetting a reconciliation will be an increased probability of conflicting updates, needing manual intervention at a later time.

Other applications for the Subject System are as follows:

Supposing the joint writing of a research paper with a colleague, one stores the various sections of the paper in a directory to which each has access. Ordinarily both users communicate directly to avoid conflicting updates, but sometimes one of the users forgets. This is handled with RECONCILE. Each user makes a private copy of the entire directory. Assuming the directories are named -tom/paper, -dick/paper, and -public/paper, and that Tom is the user in question, before beginning a working session, Tom performs the command reconcile -tom/paper -common/paper At this point there may be conflicts. If there are, Tom may need to give Dick a call to resolve them. Having done Tom is sure that his working version of the paper is in agreement with the shared version. During the course of the work various sections might be temporarily wrong, or inconsistent with each other, but since this is just a working copy and not the public version, Tom is not concerned. Eventually Tom will be happy with the final version having proofread it, and checks it back in with exactly the same command as above.

COMMAND SYNTAX

The syntax of the "RECONCILE" command is reconcile [options] [[-mode] (directory file)] . . .

If no directories or files are provided, the current working directory (".") is used.

| | |
|---|---|
| directory | names a directory containing an internal journal and files |
| file | names an external journal describing some remote site |

("—" refers to an external journal on standard input or output) mode is one or more of the following letters:

| | |
|---|---|
| r | read the journal but don't write it |
| w | write the journal but don't read it |
| o | do not update files, only the journal |

Option parameters are:

| | |
|---|---|
| -q | work quietly, suppressing messages about actions taken |
| -n | do not update any files (except journals) regardless of -u flags |
| -h | print a helpful description of the command syntax |
| -a sitename | Abandon named site. Use this to forget about a site which is no longer in use. This allows the program to discard obsolete journal entries needed only for reconciliations with old sites. Sites are automatically abandoned after two months, with warnings being printed after one month. |

As to environment, in addition to command line parameters, RECONCILE gets a name for the computer system being used from the environment variable $HOST, using "UNKNOWN" if it is undefined.

As to the overall sequence of events, RECONCILE performs its processing in the following general steps:

1. Parse parameters, building a list of sites to be reconciled. If no sites are given, use "." (the current working directory) as the only site.

2. Read the old journal file for each site.

3. For each internal site, update the journal by examining the files currently present at that site.

4. Update the list of known sites and their most recent reconciliation times. Events known from these times to be obsolete at all known sites will be discarded.

5. Perform the actual reconciliation, detecting conflicts and replicating files when there is no conflict. Update the internal journals accordingly.

6. For each site, write out an updated journal file.

These steps are described in more detail below.

As to the parameter parsing step, Step 1, this is a straightforward process of examining the parameters sequentially. It is performed by procedure "main" in module "reconcile."

For reading and writing journals as in Steps 2 and 6, journals read by procedures "readjournal" and "readentries" in module "journal", and write by procedures "writejournal" and "writeentries". The journal file format is editable text, described in the Journal File Formal section below.

As far as updates from the actual directory as in Step 3, journals are brought up to date with reality by reading the actual directory and inserting journal entries accordingly. This work is done by procedure "readdirectory" in module "journal." Current directory entries are considered one at a time. For each one found, a new journal entry for the site, time, and filename is created if none exists, and the new or existing entry is marked as having been confirmed.

After the entire directory has been read, a pass is made through the journal looking for unconfirmed entries. An unconfirmed entry indicates that a file once existed but no longer does; that is, that it has been deleted. For each such unconfirmed entry, a new journal entry is created with a deletion action and the current time as its timestamp.

For reconciliation as in Step 5, the actual reconciliation is performed on the internal representation of the journals by procedure "reconcile" in module "journal."

Reconciliation is performed only for the current entry; that is, the most recent entry for the file. Previous entries refer to out-of-date versions of the file. The goal is to make the entry and file present at every site. For each site at which the entry is not present, the program first checks to see if there is a conflict, see below. If there is none, the file is then copied from any site at which the current entry exists. Copying the file may actually be deleting it if the current event is a deletion event, or may involve creating or deleting a directory or symbolic link. Copying and deleting is done by procedures in the site module, since the action to be performed may depend on the type of site.

Detecting inconsistencies is accomplished as follows. A conflict exists for a site if the site does not have the current version of a file, but does have some previous version, and the current version is not derived from the previous one, as defined below. Existence of derivation shows that the current version came from the previous one by a connected series of user actions. This implies that it is safe to replace the prior version with the current one, since doing so is equivalent to replaying the sequence of actions in the derivation. Lack of a derivation implies that the replacement may be unsafe and therefore should not be done automatically.

A derivation is a sequence of steps which convert the older version to the newer one. Each step is directly reflected in the journal of some site as a successive pair of entries, one following the other, with no other entries for the file in between at that site. There might be intervening entries at other sites, which would mean conflicts elsewhere but not for the derivation being considered. This sequentiality at a particular site implies that the later of the two successive versions was created directly by editing or modifying the earlier of the two. A derivation is like an audit trail. As it records all the steps taken to convert the older version to the newer one.

Existence of a derivation is determined by procedure "connected" of module "journal", which follows the direct steps backward from the current version, skipping unrelated events, until it reaches the prior version.

With respect to discarding obsolete events (step 4), without some way of discarding obsolete events, the journal files would grow indefinitely. An event is obsolete at a given site if there is a more recent event for the same file at the same site. If an event is obsolete at all sites, it can be discarded because it will never cause an inconsistency.

In order to track this, journals contains a list of "known sites", each marked with time of the most recent reconciliation involving the known site. This list is propagated and updated as reconciliations occur. The known site times indicate when information came from the known sites. In addition, each known site reflects these time stamps back by generating a list of acknowledgements. An acknowledgement gives the name of the known site, the name of a site known to it, and the timestamp of that source site. Again, these acknowledgements are propagated and updated appropriately. Originating sites may use the timestamps of the acknowledgements to determine when events are obsolete at other sites. Any event which happened before the oldest acknowledgement time must have been propagated to all known sites, so its predecessors can be discarded without causing conflicts.

Finally, there is a potential problem about lost sites. If a site fails to produce acknowledgements, it will cause events to accumulate indefinitely. This could easily happen if the site is no longer used. To avoid this, the program issues warnings about any sites last heard from more than a month ago, and removes them from the known site list after two months. There is also a way to discard a known site immediately.

Note that as to Journal File Format, journal files are standard text files which can be observed and even changed with any text editor. The files are formatted with one line per entry, plus a header line.

The header line has the format:

Journal of <sitename> <date> <time>—<programname>where <sitename> is the fully qualified name of the file hierarchy being journaled, <date> and <time> are the time the journal was written, and <programname> identifies the specific program which wrote the journal.

The entry lines each contain a fixed set of fields, separated by tabs, in the format:

<verb> <date> <time> <name><type> where:

<verb> is one of a limited set of literals denoting possible actions:

+—create or update, making a new Version

-—delete

*—some other site has a more recent Version, but it conflicts with the previous Version at this site.

<date> is the date the action occurred (yy/mm/dd format)

<time> is the time the action occurred (hh:mm:ss format)

<name> is the file's name, followed directly by the type (no intervening tab)

<type> is a single character;

(nothing) for an ordinary file

\ for a subdirectory

@ for a symbolic link

Supplementary lines give the date and time of the most recent reconciliation for each known site. Each line is of the form:

$ <date> <time> <sitename>

Acknowledgements immediately follow the known site line for the acknowledging site, and are of the form . <date> <time> <sitename> where the acknowledging site (named by the immediately preceding known site line) is simply reflecting a reconciliation time back to its source.

Note that the RECONCILE program of Appendix A is built out of the following source modules, each of which is represented by a C++ source file (<name>.cpp) and a corresponding header file (<name>.h).

| | |
|---|---|
| reconcil | Main program, parameter analysis, and user message generation. |
| site | Defines sites. |
| journal | Defines journals, performs most of the actual work. |
| timestmp | Defines internal and external formats for date and time information. |
| myalloc | Performs storage allocation and checks for memory leaks. |
| entry | Defines individual events. |
| filesys | Performs local file system input/output operations. |
| knownsit | Defines known sites, manages times for deleting obsolete events. |
| parse | Supports text parsing operations in parameter and journal file processing. |

The following is a program listing for the RECONCILE program, referred to herein as APPENDIX A.

APPENDIX A entry.h 1

```
////////////////////////////////////////////////////////////////////////
//                                                                    //
// entry.h - journal entries                                          //
//                                                                    //
// Declares class Entry                                               //
//                                                                    //
// An Entry describes a single element of some directory.  It         //
// might be a plain file, a subdirectory, or (in Unix) a symlink.     //
//                                                                    //
// Entries are chained together to make Journals.                     //
//                                                                    //
// A single Entry describes files at all Sites, with a mask field     //
//   indicating which Sites know about the Entry.  This organization  //
//   makes it relatively easy to merge and compare different Sites'   //
//   Journals.                                                        //
//                                                                    //
////////////////////////////////////////////////////////////////////////

typedef unsigned char Action;
#define CA_UNK  0
#define CA_ADD  1
#define CA_GON  2
#define CA_GET  3
#define CA_DEL  4
#define CA_ERR  5

typedef unsigned char EntryType;
#define ET_FILE 0
#define ET_DIR 1
#define ET_LINK 2


class Entry {

    friend class Journal;

public:

    // constructor
    Entry(const Action actionarg,         // action
        const char* enamearg,             // entry name
        const TimeStamp& ts,              // entry timestamp
        EntryType typearg);               // entry type

    // destructor
    ~Entry(void);

    // parse entry line in buffer
    static BOOL parseentry(const char* buff,
        const char*& errmsg,              // resulting error message, or NULL
        Site* s,                          // site providing entry
        Journal* k);                      // journal being entered

    // write entry line to new journal
    void writeentry(FILE* journalfile,
        Action action);                   // updated action

    // get next entry for the same file, VOID if no more
    Entry* nextentryforfile(void);

    // get previous entry for the same file, VOID if no more
    Entry* preventryforfile(void);
```

entry.h 2

```
    // get last entry for the same file
    Entry* lastentryforfile(void);

    // get previous entry for this file known at a site
    Entry* prevlistedentry(Site* s);

    // get next entry for this file and site, VOID if none
    Entry* overridingentry(Site* s);

    // TRUE if there is a causal chain from this entry to entry f
    BOOL isconnected(Entry* f);

    // adopt (grab and merge in) children of another entry
    void adoptchildren(Entry* o);

    // TRUE if entry known to site
    BOOL islisted(Site* s) { return ((listmask & s->getmask()) != 0); }

    // associate entry with site
    void makelisted(int mask, int& writemask) {listmask |= mask;writemask |= mask;}

    // remove entry from site
    void makeunlisted(int mask, int& writemask) {listmask &= ~mask;writemask |= mask;}

    // TRUE if entry in site's current directory (local only)
    BOOL isconfirmed(Site* s) { return ((suremask & s->getmask()) != 0); }

    // grab child subdirectory, leaving a NULL behind
    Journal* grabchild(void) {Journal* rc = child; child = NULL; return rc;}

    // create child subdirectory
    void makechild(const char* name);

    // remember that this entry is present in local directory
    void setsure(int mask) {suremask |= mask;}

private:                          // no fair peeking in here!

    Entry* nextentry;             // next entry in this journal
    Entry* preventry;             // previous entry in this journal

    const char* entryname;        // filename within directory
    int listmask;                 // flags for listed at site
    int suremask;                 // flags for file actually found
    Action action;                // action on this entry
    EntryType type;               // type of this entry
    TimeStamp timemodified;       // time file last modified
    Journal* child;               // journal of subdirectory
};
```

filesys.h 1

```
////////////////////////////////////////////////////////////////////////
//                                                                    //
// filesys.h - interface to file system                               //
//                                                                    //
////////////////////////////////////////////////////////////////////////


// file i/o entry points

BOOL getattributes(const char* targetname, struct stat* sb);
BOOL setattributes(const char* targetname, struct stat* sb);
BOOL copyfile(const char* sourcename, const char* targetname);
BOOL rmfile(const char* targetname);
BOOL createsubdir(const char* targetname, struct stat* sb);
BOOL rmsubdir(const char* targetname);
BOOL readsymlink(const char* sourcename, char* buff, int size, struct stat* sb);
BOOL createlink(const char* targetname, char* buff, struct stat* sb);
BOOL rmlink(const char* targetname);

// construct path names out of their components
extern const char* getpathname(const char* dirname, const char* dirpath, const char* entry
name,
    const char* sourcefile, const int sourceline);
#define GETPATHNAME(d, p, f) getpathname(d, p, f, __FILE__, __LINE__)

// get first element from a path name
extern BOOL getfirstpathelement(const char*& scan, const char*& element);

// get disk label
extern void getlabel(const char* drive, char *label, int labelsize);


// -------- pathname manipulation (defined in DOS, but not in Unix) --------

// convert a pathname from relative to absolute, put in buffer
extern char* _fullpath(char* buffer, const char* path, int buflen);

// split pathname into it various components
extern void _splitpath(const char* path, char* drive, char* dir, char* name, char* ext);

// reconstruct path name from component parts (any of which might be NULL)
void _makepath(char *path, const char* drive, const char* dir, const char* name, const cha
r* ext);

#ifndef __MSDOS__

#include "sys/param.h"
#include "sys/dirent.h"

#define _MAX_PATH       MAXPATHLEN + 1
#define _MAX_DRIVE      1
#define _MAX_DIR        MAXPATHLEN
#define _MAX_FNAME      MAXNAMLEN + 1
#define _MAX_EXT        MAXNAMLEN - 1 + 1

#endif // __MSDOS__
```

journal.h 1

```
////////////////////////////////////////////////////////////////////////
//                                                                    //
// journal.h - journal interface                                      //
//                                                                    //
// Declares class Journal.                                            //
//                                                                    //
//                                                                    //
// A Journal is a list of entries for a directory or subdirectory.    //
//                                                                    //
// Journals are arranged in a hierarchy by using the child field      //
//   of those entries which describe subdirectories.                  //
//                                                                    //
// Also, Journal provides a list of journals.                         //
//    This is used to keep a list of not-yet-processed Journals.      //
//                                                                    //
////////////////////////////////////////////////////////////////////////

class Journal{

public:

    Journal(const char* subdirarg);       // constructor
    ~Journal(void);                       // destructor

    // find or create entry by name and insert in journal
    Entry* getentry(
        const Action action,              // action, etc, for new entry
        const char* entryname,
        const TimeStamp& ts,
        EntryType type,
        int mask);                        // site's mask

    void deleteentry(Entry* e);           // delete entry from journal
    void combinejournals(Journal* other);       // merge two journals

    // do all processing on one journal
    void processjournal(BOOL toplevel, Journal*& journalstobedone);

    Journal* grabnextjournal(void) {Journal* j = nextjournal; nextjournal = NULL; return j
;}

private:

    Journal* nextjournal;         // next journal in some list of journals
    class Entry* firstentry;      // first entry in this journal
    const char* subdir;           // subdirectory name within tree
    int writemask;                // site flags for write needed

    BOOL parseheader(const char* buff, const char*& sitename);  // parse header line
    BOOL readdirectory(Site* s);          // read local directory
    BOOL inferdeletions(Site* s);         // infer deletions from missing entries
    BOOL readjournal(Site* s);            // read journal for site
    void combinesubdirs(void);            // merge two subdirectory entries
    void reconcile(void);                 // reconcile combined journals
    void writejournal(Site* s, BOOL toplevel);  // write journal for site
    void capturechildren(Journal* &journalstobedone);   // capture children

};
```

2 knownsit.h

```
///////////////////////////////////////////////////////////////////////
//                                                                   //
// knownsit.h - declares class KnownSite                             //
//                                                                   //
///////////////////////////////////////////////////////////////////////


class TimeStamp;                    // referred to below


// -------- KnownSite class declaration --------

class KnownSite {

public:

    // parse buffer and create new known site (or ack)
    static BOOL parseknown(
        const char* buff,           // input buffer
        const char*& errmsg,        // error message, or NULL
        int& k);                    // set for site, used for following acks

    // record acknowlegement that sname has seen data from rname
    static void acknowlege(const char* sname, const char* rname);

    // record fact that sname was updated by this reconciliation
    static void reconciliationtarget(const char* sname);

    // get rid of known site
    static void killsite(const char* sname);

    // get rid of obsolete sites
    static void killoldsites(void);

    // get oldest acknowlegement from all sites to site sname
    static TimeStamp getacktime(const char* sname);

    // write known sites and acks to journal
    static void writeknownsites(FILE* journalfile);

    // clean up known sites at end of run
    static void resetknownsites(void);

private:

    const char* sitename;           // name of known site
    BOOL killed;                    // suppress this site

    KnownSite(void);                // (private!) constructor
    ~KnownSite(void);               // (private!) destructor

    static int findknownsite(const char* sname);        // find, dont make
    static int makeknownsite(const char* sname);        // find or make
    static void internalack(int k, int j, TimeStamp& tm);

    static int nknown;              // number of known sites
    static KnownSite* known;        // vector of known sites
    static TimeStamp* ack;          // acks[i, j] = ack[i * nknown + j]
                                    // acks[i, i] = time i was last heard from
                                    // acks[i, j] = i's knowledge of j's time
                                    //     (i acknowleges j)
};
```

parse.h

```
///////////////////////////////////////////////////////////////////////
//                                                                   //
// parse.h - parsing routines                                        //
//                                                                   //
///////////////////////////////////////////////////////////////////////

// compare prefix with string, return pointer past it if match, NULL if not
extern const char *skipprefix(const char *prefix, const char *string);

// scan one "word" (bounded by whitespace) into buffer, return advanced scan
extern const char *getword(const char *scan, char *buff, int size);

// compare two file names (case insensitive in DOS)
extern int namecomp(const char *string1, const char *string2);

// return pointer to beginning of next word in buffer (skip current one)
extern char *nextword(char *buff);
```

myalloc.h

```
///////////////////////////////////////////////////////////////////////
//                                                                   //
// myalloc.h - safe memory allocation & core leak detection          //
//                                                                   //
// Defines memory allocation and release procedures with ability to  //
//   catch failure to free allocated memory or to doubly allocate.   //
//                                                                   //
// Tests return codes, aborts if error.                              //
//                                                                   //
// Also supports one very large buffer for fast file copying.        //
//                                                                   //
///////////////////////////////////////////////////////////////////////


// -------- macro entry points --------

// use the macros to automate line number identification

// allocate an instance of a pointed-to object
#define GETMEM(something) getmem((void **)&(something), sizeof *(something),__FILE__, __L
INE__)

// allocate an instance of a pointed-to object, copy a string to it
#define GETCOPY(something, old) getcopy((void **)&(something), old, __FILE__, __LINE__)

// release an instance of a pointed-to object
#define RELMEM(something) relmem((void **)&something, __FILE__, __LINE__)

// append to a string, releasing old s1 and allocating new, larger s1
#define APPENDSTRING(s1, s2) appendstring(s1, s2, __FILE__, __LINE__)

// copy a string to new allocated string
#define COPYSTRING(something) copystring(something, __FILE__, __LINE__)


// -------- true routines --------

extern void getmem(void **something, const int size, const char *sourcefile, const int sou
rceline);
extern void getcopy(void **dst, const char *src, const char *sourcefile, const int sourcel
ine);
extern void relmem(void **something, const char *sourcefile, const int sourceline);
extern char *appendstring(const char *string1, const char *string2, const char *sourcefile
, const int sourceline);
extern char *copystring(const char *source, const char *sourcefile, const int sourceline);

// call this at the end of the program run
extern void verifyeverythingfreed(void);


// -------- large buffer allocation --------

// allocate large buffer
extern void getbuffer(char*& buffer, int& buffsize);

// release large buffer
extern void relbuffer(char*& buffer);
```

reconcil.h

```
///////////////////////////////////////////////////////////////////////
//                                                                   //
// reconcil.h - global constants and variables for reconcile program //
//                                                                   //
// This file defines the interface for reconcil.cpp                  //
//                                                                   //
///////////////////////////////////////////////////////////////////////


// boolean value type missing from C language

#ifndef BOOL
#define BOOL int
#define FALSE 0
#define TRUE 1
#endif

// journal file name
#ifdef __MSDOS__
#define JOURNALFILE "internal.jnl"
#else // __MSDOS__
#define JOURNALFILE ".journal"
#endif // __MSDOS__


// program-wide parameters

extern char *version;           // name and version of the program
extern BOOL quiet;              // run with a minimum of messages (-q option)
extern BOOL noupdate;           // do not update any directories (-n option)
extern BOOL problems;           // reconciliation was imperfect


// entry points in reconcil.cpp

// non-error message "verb from source to target"
void InfoMessage(const char* verb, const char* source, const char* target);

// warning message - program continues
void WarningMessage(const char *message, ...);

// warning message - error doing system operation
void FilesystemMessage(const char *verb, const char *filename);

// error message - program exits
void FatalMessage(const char *message, ...);

// error message - internal problem - program exits
void AssertionFailed(const char *file, const int line);
#define FAILURE AssertionFailed(__FILE__, __LINE__)
#define ASSERT(p) if (!(p)) FAILURE
```

3 site.h 1

```
//////////////////////////////////////////////////////////////////////
//                                                                  //
// site.h - description of a site being reconciled with others      //
//                                                                  //
// Defines class Site                                               //
//                                                                  //
//////////////////////////////////////////////////////////////////////

// -------- Site class declaration --------

class Site {

public:

    Site(BOOL rmode, BOOL wmode);       // constructor
    virtual ~Site(void);                // destructor
    static void resetsites(void)        // delete all sites
        {delete firstsite;}

    virtual BOOL islocal(void) = 0;     // is a local site
    BOOL issource(void)                 // provides reconciliation info
        {return (islocal() || !writeonly);}
    BOOL istarget(void)                 // receives reconciliation info
        {return (islocal() && !readonly);}
    BOOL isreadable(void)               // OK to read journal
        {return !writeonly;}
    BOOL iswritable(void)               // OK to write journal
        {return !readonly;}
    virtual BOOL isupdatable(void)      // OK to update
        {return FALSE;}

    void donotwrite(void)               // prevent writing journal
        {readonly = TRUE;}

    static Site* getfirstsite(void)     // start iteration over sites
        {return firstsite;}
    Site* getnextsite(void)             // continue iteration over sites
        {return nextsite;}

    void setsitename(const char* sitenamearg);  // set actual site name
    const char* getsitename(void)       // get site name
        {return (sitename != NULL) ? sitename : getrootname();}
    virtual const char* getrootname(void)       // get local directory root
        {return NULL;}
    int getmask(void)                   // get site mask bit
        {return mask;}
    TimeStamp getacktime(void)          // get time of last ack
        {return acktime;}
    void setacktime(TimeStamp ts)       // set time of last ack
        {acktime = ts;}

    // journal file i/o
    virtual FILE* openjournal(const char* subdir, const char* mode) = 0;
    virtual void complainaboutjournalfile(const char* subdir, const char* message, const c
har* buff) = 0;

private:

    static Site* firstsite;     // head of site list
    Site* nextsite;             // next in site list

    const char* sitename;       // site name - as consistent as possible
```

timestamp.h 1

```
//////////////////////////////////////////////////////////////////////
//                                                                  //
// timestamp.h - time stamping and comparison                       //
//                                                                  //
// Declares class TimeStamp.                                        //
// Declares global variable "now", time program is being run.       //
//                                                                  //
//////////////////////////////////////////////////////////////////////

class TimeStamp {

public:

    // constructor
    TimeStamp(void);

    // reset to very early time (can distinguish with neverset() below)
    void reset(void);

    // set from a system time
    void stamptime(time_t systemtime);

    // extract a system time
    time_t gettime(void);

    // fill in date from text in buffer
    BOOL parsedate(const char* buff);

    // fill in time from text in buffer
    BOOL parsetime(const char* buff);

    // format date to returned string
    char* showdate(void);

    // format time to returned string
    char* showtime(void);

    // compare two timestamps (returns -1, 0, +1, as if ts1-ts2)
    friend int comparetimes(const TimeStamp& ts1, const TimeStamp& ts2);

    // set to now - months
    void getpast(const int months);

    // TRUE if timestamp was reset, never set to an actual value
    BOOL neverset(void) {return (mo == 0);}

private:

    unsigned char yr;
    unsigned char mo;
    unsigned char dy;
    unsigned char hr;
    unsigned char mn;
    unsigned char sc;

};

// -------- globals --------

extern TimeStamp now;
```

site.h 2

```
    int mask;                   // mask bit for this site
    static int nextmask;        // next unallocated site mask
    BOOL writeonly;             // do not read old journal file
    BOOL readonly;              // do not write new journal file
    TimeStamp acktime;          // time acknowleged by all known sites

};

// -------- LocalSite subclass --------

class LocalSite : public Site {

public:

    LocalSite(const char* name, BOOL rmode, BOOL wmode, BOOL omode);
    ~LocalSite(void);

    BOOL islocal(void) { return TRUE; }
    BOOL isupdatable(void) {return (!noupdate && updateDir);}
    const char* getrootname(void) {return rootname;}

    FILE* openjournal(const char* subdir, const char* mode);
    void complainaboutjournalfile(const char* subdir, const char* message, const char* buf
f);

private:

    const char* rootname;       // pathname of data subtree
    BOOL updateDir;             // update files in directory

};

// -------- RemoteSite subclass --------

class RemoteSite : public Site {

private:

    const char* jnlname;        // external journal file name

public:

    RemoteSite(const char* name, BOOL rmode, BOOL wmode);
    ~RemoteSite(void);

    BOOL islocal(void) { return FALSE; }

    FILE* openjournal(const char* subdir, const char* mode);
    void complainaboutjournalfile(const char* subdir, const char* message, const char* buf
f);

};
```

4

93/05/11 14:30:38 entry.cpp 1

```
///////////////////////////////////////////////////////////////////////
//                                                                   //
// entry.cpp - journal entries                                       //
//                                                                   //
// Defines individual journal entries, one per file/subdir/symlink   //
//                                                                   //
///////////////////////////////////////////////////////////////////////

// -------- includes --------

#include "stdio.h"
#include "time.h"
#include "string.h"

#include "reconcil.h"
#include "myalloc.h"
#include "timestmp.h"
#include "parse.h"
#include "site.h"
#include "entry.h"
#include "journal.h"

// -------- Entry code --------

// entry constructor

Entry::Entry(const Action actionarg, const char* enamearg, const TimeStamp& ts, EntryType
typearg)
{
    entryname = NULL;
    GETCOPY(entryname, enamearg);
    timemodified = ts;
    listmask = 0;
    suremask = 0;
    action = actionarg;
    type = typearg;
    child = NULL;
}

// entry destructor

Entry::~Entry(void)
{
    RELMEM(entryname);
    if (child != NULL)
        delete child;
}

// classify verb in entry description

static const char* classify(const char* scan, Action* result)
{
    char buff[9];
    scan = getword(scan, buff, sizeof buff);
    if (     strcmp(buff, "ADD") == 0 || buff[0] == '+' && buff[1] == '\0')
        *result = CA_ADD;
    else if (strcmp(buff, "GON") == 0 || buff[0] == '-' && buff[1] == '\0')
        *result = CA_GON;
    else if (strcmp(buff, "GET") == 0 || buff[0] == ':' && buff[1] == '\0')
        *result = CA_GET;
    else if (strcmp(buff, "DEL") == 0 || buff[0] == ':' && buff[1] == '\0')
```

93/05/11 14:30:38 entry.cpp 2

```
        *result = CA_DEL;
    else if (strcmp(buff, "ERR") == 0 || buff[0] == '*' && buff[1] == '\0')
        *result = CA_ERR;
    else
        *result = CA_UNK;
    return scan;
}

// parse entry from a journal file

BOOL Entry::parseentry(const char* buff, const char*& errmsg, Site* s, Journal* k)
{
    char word[65];
    const char* scan;
    char* wp;
    Action action;
    TimeStamp ts;
    EntryType type;

    scan = buff;
    scan = classify(scan, &action);
    if (action == CA_UNK)
        return FALSE;
    if (action == CA_ADD || action == CA_GON) {
        scan = getword(scan, word, sizeof word);
        if (!ts.parsedate(word)) {
            errmsg = "wrong date format in journal";
            return FALSE;
        }
        scan = getword(scan, word, sizeof word);
        if (!ts.parsetime(word)) {
            errmsg = "wrong time format in journal";
            return FALSE;
        }
        if (comparetimes(ts, now) > 0) {
            errmsg = "future timestamp in journal";
            return FALSE;
        }
        scan = getword(scan, word, sizeof word);
        for (wp = word; *wp != '\0'; wp++) ;
        if (wp > word) wp--;
        switch(*wp) {
        case '/': *wp = '\0'; type = ET_DIR; break;
        case '@': *wp = '\0'; type = ET_LINK; break;
        default: type = ET_FILE;
        }
        if (action == CA_ADD || action == CA_GON)
            k->getentry(action, word, ts, type, s->getmask());
    }
    return TRUE;
}

// write entry to new journal

void Entry::writeentry(FILE* journalfile, Action action)
{
    char* verb;

    switch(action) {
    case CA_ADD: verb = "+"; break;
    case CA_GON: verb = "-"; break;
    case CA_GET: verb = ":+"; break;
    case CA_DEL: verb = ":-"; break;
```

93/05/11 14:30:38 entry.cpp 3

```
    case CA_ERR: verb = "*"; break;
    default: FAILURE;
    }
    fprintf(journalfile, "%s %s %s %s%s\n", verb,
      timemodified.showdate(),
      timemodified.showtime(),
      entryname,
      (type == ET_DIR) ? "/" : (type == ET_LINK) ? "@" : "");
}

// return next entry for same file

Entry* Entry::nextentryforfile(void)
{
    Entry* n = nextentry;
    if (n != NULL && namecomp(n->entryname, entryname) != 0)
        return NULL;
    return n;
}

// return previous entry for same file

Entry* Entry::preventryforfile(void)
{
    Entry* p = preventry;
    if (p != NULL && namecomp(p->entryname, entryname) != 0)
        return NULL;
    return p;
}

// return last entry for same file

Entry* Entry::lastentryforfile(void)
{
    Entry* n = this;
    while (n->nextentry != NULL && namecomp(entryname, n->nextentry->entryname) == 0)
        n = n->nextentry;
    return n;
}

// return previous entry for file which is logged at site

Entry* Entry::prevlistedentry(Site* s)
{
    Entry* q = this;

    while ((q = q->preventryforfile()) != NULL)
        if (q->islisted(s))
            return q;
    return NULL;
}

// find a more recent entry for this file and site

Entry* Entry::overridingentry(Site* s)
{
    Entry* e = this;
    while ((e = e->nextentryforfile()) != NULL)
        if (e->islisted(s) || !s->issource())
            return e;
    return NULL;
}
```

93/05/11 14:30:38 entry.cpp 4

```
// TRUE if there is a causal chain from e to f

BOOL Entry::isconnected(Entry* f)
{
    Entry* n; // entry known to be connected to f
    n = f;
    while (this != f) {
        f = f->preventryforfile();
        ASSERT(f != NULL);
        if ((f->listmask & n->listmask) != 0)
            n = f;
    }
    return (this == n);
}

// adopt the children of another entry

void Entry::adoptchildren(Entry* n)
{
    if (child == NULL) {
        child = n->child;
        n->child = NULL;
    }
    else if (n->child != NULL)
        child->combinejournals(n->child);
}

// create child

void Entry::makechild(const char* name)
{
    child = new Journal(name);
}
```

5 filesys.cpp 1

```
///////////////////////////////////////////////////////////////////////
//                                                                  //
// filesys.cpp - interface to file system                           //
//                                                                  //
///////////////////////////////////////////////////////////////////////


// --------includes--------

#include "stdlib.h"
#include "sys/stat.h"
#include "fcntl.h"
#include "utime.h"
#include "string.h"

#ifdef __MSDOS__
#define PATHSEPARATOR '\\'
#define PATHSEPARATORSTRING "\\"
#include "dos.h"
#include "io.h"
#include "dir.h"
#else // __MSDOS__
#define PATHSEPARATOR '/'
#define PATHSEPARATORSTRING "/"
#include "unistd.h"
#include "symlink.h"
#endif // __MSDOS__

#include "reconcil.h"
#include "filesys.h"
#include "myalloc.h"


// --------file system code--------

// copy file from site to site

BOOL copyfile(const char* sourcename, const char* targetname)
{
    int n;
    int rc;
    struct stat sb;
    int infd;
    int outfd;
    char* buffer;
    int buffsize;

#ifdef __MSDOS__
    int savefmode = _fmode;
    _fmode = O_BINARY;
#endif // __MSDOS__

    infd = open(sourcename, O_RDONLY);

    if (infd < 0) {
        FileSystemMessage("open", sourcename);
        return FALSE;
    }

    if (fstat(infd, &sb) < 0) {
        FileSystemMessage("get attributes of", sourcename);
        close(infd);
        return FALSE;
```

filesys.cpp 2

```
    }

    if (infd < 0)
        return FALSE;

    outfd = creat(targetname, sb.st_mode);

#ifdef __MSDOS__
    _fmode = savefmode;
#endif // __MSDOS__

    if (outfd < 0) {
        FileSystemMessage("write", targetname);
        close(infd);
        return FALSE;
    }

    getbuffer(buffer, buffsize);

    for (;;) {              // copy loop
        if ((n = read(infd, buffer, buffsize)) < 0) {
            FileSystemMessage("read", sourcename);
            close(infd);
            close(outfd);
            rmfile(targetname);
            relbuffer(buffer);
            return FALSE;
        }

        if (n <= 0) break;

        while (n > 0) {
            rc = write(outfd, buffer, n);
            if (rc < 0)
               break;
            n -= rc;
        }
        if (rc < 0) {
            FileSystemMessage("write", sourcename);
            close(infd);
            close(outfd);
            rmfile(targetname);
            relbuffer(buffer);
            return FALSE;
        }
    }                       // copy loop

    close(infd);
    close(outfd);
    setattributes(targetname, &sb);

    relbuffer(buffer);
    return TRUE;
}

// create new subdirectory

BOOL createsubdir(const char* targetname, struct stat* sb)
{
    BOOL saveproblems;

    if (mkdir(targetname
#ifndef __MSDOS__
```

filesys.cpp 3

```
       , sb->st_mode
#endif // __MSDOS__
       ) < 0) {
        FileSystemMessage("create subdirectory", targetname);
        return FALSE;
    }

    saveproblems = problems;
    setattributes(targetname, sb);
    problems = saveproblems;

    return TRUE;
}

// read symbolic link

#ifdef __MSDOS__
#pragma argsused
#endif // __MSDOS__
BOOL readsymlink(const char* sourcename, char* buff, int size, struct stat* sb)
{
#ifdef __MSDOS__
    return FALSE;
#else // __MSDOS__

    if (!getattributes(sourcename, sb))
        return FALSE;

    if (readlink(sourcename, buff, size)< 0) {
        FileSystemMessage("read link", sourcename);
        return FALSE;
    }
    return TRUE;
#endif // __MSDOS__
}

// create symbolic link

#ifdef __MSDOS__
#pragma argsused
#endif // __MSDOS__
BOOL createlink(const char* targetname, char* buff, struct stat* sb)
{
#ifdef __MSDOS__
    return FALSE;
#else // __MSDOS__

    if (symlink(buff, targetname) < 0) {
        FileSystemMessage("create link", targetname);
        return FALSE;
    }

    setattributes(targetname, sb);

    return TRUE;
#endif // __MSDOS__
}

// get attributes

BOOL getattributes(const char* sourcename, struct stat* sb)
{
    if (stat(sourcename, sb) < 0) {
```

filesys.cpp 4

```
        FileSystemMessage("get attributes of", sourcename);
        return FALSE;
    }
    return TRUE;
}

// set attributes

BOOL setattributes(const char* targetname, struct stat* sb)
{
    struct utimbuf ut;

    ut.actime = sb->st_atime;
    ut.modtime = sb->st_mtime;
    if (utime((char*)targetname, &ut) < 0)
        FileSystemMessage("set date for", targetname);
    if (chmod(targetname, sb->st_mode) < 0)
        FileSystemMessage("set access control for", targetname);
    return TRUE;
}

// remove file

BOOL rmfile(const char* targetname)
{
    if (unlink(targetname) < 0)
        FileSystemMessage("remove", targetname);

    return TRUE;
}

// remove subdirectory

BOOL rmsubdir(const char* targetname)
{
    if (rmdir(targetname) < 0) // probably nonempty xxx
        FileSystemMessage("remove subdirectory", targetname);

    return TRUE;
}

// remove link

#ifdef __MSDOS__
#pragma argsused
#endif // __MSDOS__
BOOL rmlink(const char* targetname)
{
#ifdef __MSDOS__
    return FALSE;
#else // __MSDOS__

    if (unlink(targetname) < 0)
        FileSystemMessage("remove link", targetname);

    return TRUE;
#endif // __MSDOS__
}

// -------- Pathname manipulation (defined in DOS, but not in Unix) --------

#ifndef __MSDOS__
```

6

93/05/11 14:26:06 filesys.cpp 5

```
// convert a path name from relative to absolute

char* _fullpath(char* buffer, const char* path, int buflen)
{
    int n;

    if (*path == PATHSEPARATOR) {
        if (strlen(path) >= buflen)
            return NULL;
        strcpy(buffer, path);
    }
    else {
        if (*path == '.' && *(path + 1) == PATHSEPARATOR)
            path += 2;
        if (getcwd(buffer, buflen) == NULL)
            return NULL;
        n = strlen(buffer);
        if (n + 1 + strlen(path) >= buflen)
            return NULL;
        buffer[n++] = PATHSEPARATOR;
        strcpy(buffer + n, path);
    }
    return buffer;
}

// split a pathname into its various components

void _splitpath(const char* path, char* drive, char* dir, char* name, char* ext)
{
    int n, sep, dot;

    if (path == NULL) path = "";
    for (sep = dot = n = 0; path[n] != '\0'; n++) {
        switch(path[n]) {
        case PATHSEPARATOR:
            sep = n + 1;
            dot = 0;
            break;
        case '.':
            dot = n + 1;
            break;
        }
    }
    if (dot == 0)
        dot = n + 1;
    dot -= 1;

    if (drive != NULL)
        *drive = '\0';

    if (dir != NULL) {
        strncpy(dir, path, sep);
        dir[sep] = '\0';
    }

    if (name != NULL) {
        strncpy(name, path + sep, dot - sep);
        name[dot - sep] = '\0';
    }

    if (ext != NULL) {
        strncpy(ext, path + dot, n - dot);
```

93/05/11 14:26:06 filesys.cpp 6

```
        ext[n - dot] = '\0';
    }
}

// reconstruct file name from component parts

void _makepath(char *path, const char* drive, const char* dir, const char* name, const cha
r* ext)
{
    int n;

    if (drive != NULL && *drive != '\0')
        FAILURE;

    if (dir != NULL && *dir != '\0') {
        n = strlen(dir);
        strcpy(path, dir);
        path += n;
        if (dir[n-1] != PATHSEPARATOR)
            *path++ = PATHSEPARATOR;
    }

    if (name != NULL && *name != '\0') {
        n = strlen(name);
        strcpy(path, name);
        path += n;
    }

    if (ext != NULL && *ext != '\0') {
        if (*ext != '.')
            *path++ = '.';
        strcpy(path, ext);
    }
}

#endif // __MSDOS__

// -------- file name manipulation --------

// get fully qualified file name from directory and entry name

const char* getpathname(const char* dirname, const char* dirpath, const char* entryname,
    const char* sourcefile, const int sourceline)
{
    const char* scan;
    const char* namestart;
    const char* pathname;

    if (dirname == NULL || dirname[0] == '.' && dirname[1] == '\0')
        pathname = copystring("", sourcefile, sourceline);
    else
        pathname = copystring(dirname, sourcefile, sourceline);

    if (dirpath == NULL) dirpath = "";
    if (entryname == NULL) entryname = "";
    if (*dirpath == '\0' &&* entryname == '\0') {
        if (*pathname == '\0') {
            RELMEM(pathname);
            GETCOPY(pathname, ".");
        }
        return pathname;
```

93/05/11 14:26:06 filesys.cpp 7

```
    }

    namestart = pathname;
    for (scan = pathname; *scan != '\0'; scan++) {
        switch(*scan) {
#ifdef __MSDOS__
            case ':':
                namestart = scan + 1;
                break;
#endif // __MSDOS__
            case PATHSEPARATOR:
                namestart = scan + 1;
                break;
        }
    }

    if (namestart < scan)
        pathname = appendstring(pathname, PATHSEPARATORSTRING, sourcefile, sourceline);
    if (*dirpath != '\0') {
        pathname = appendstring(pathname, dirpath, sourcefile, sourceline);
        if (*entryname != '\0')
            pathname = appendstring(pathname, PATHSEPARATORSTRING, sourcefile, sourceline)
;
    }
    if (*entryname != '\0')
        pathname = appendstring(pathname, entryname, sourcefile, sourceline);
    return pathname;
}

// get one element from path name

BOOL getfirstpathelement(const char*& scan, const char*& element)
{
    char buff[256];
    char* stuff;

    if (scan == NULL)
        return FALSE;
    while (*scan == PATHSEPARATOR)
        scan++;
    for (stuff = buff; *scan != '\0' && *scan != PATHSEPARATOR; scan++)
        *stuff++ = *scan;
    *stuff = '\0';
    if (*buff == '\0')
        return FALSE;
    element = NULL;
    GETCOPY(element, buff);
    return TRUE;
}

// get disk label

void getlabel(const char* drive, char *label, int labelsize)
{
    static char* hostname = NULL;

#ifdef __MSDOS__
    int i, j;
    struct ffblk ffblk;
    char path[_MAX_PATH];

    _makepath(path, drive, "\\", "*", "*");
    if (findfirst(path, &ffblk, FA_LABEL) == 0 && (ffblk.ff_attrib & FA_LABEL) != 0) {
```

93/05/11 14:26:06 filesys.cpp 8

```
        for (i = j = 0; i < sizeof ffblk.ff_name && ffblk.ff_name[i] != '\0'; i++) {
            if (ffblk.ff_name[i] != '.' && j < labelsize - 1)
                label[j++] = ffblk.ff_name[i];
        }
        label[j] = '\0';
        return;
    }
#else // __MSDOS__
    drive = drive;  // prevent warning about drive not used
#endif // __MSDOS__

    // disk label didn't work, use host name

    if (hostname == NULL)
        hostname = getenv("HOST");
    if (hostname == NULL)
        hostname = "UNKNOWN";
    strncpy(label, hostname, labelsize);
    label[labelsize - 1] = '\0';
}
```

7 journal.cpp 1

```
///////////////////////////////////////////////////////////////////////
//                                                                   //
// journal.cpp - journal manipulation routines                       //
//                                                                   //
// Defines class Journal, performs most major manipulations.         //
//                                                                   //
///////////////////////////////////////////////////////////////////////


// -------- includes --------

#include "stdio.h"
#include "sys/stat.h"
#include "stdlib.h"
#include "ctype.h"
#include "time.h"
#include "string.h"

#include "dirent.h"
#ifdef __MSDOS__
#define lstat stat
#endif // __MSDOS__

#include "myalloc.h"

#include "reconcil.h"
#include "timestmp.h"
#include "site.h"
#include "knownsit.h"
#include "entry.h"
#include "journal.h"
#include "parse.h"
#include "filesys.h"


// -------- internal statics & declarations --------

static char* jheader = "Journal of";



// -------- Journal code --------

// Journal constructor

Journal::Journal(const char* subdirarg)
{
    nextjournal = NULL;
    firstentry = NULL;
    subdir = subdirarg;
    writemask = 0;
}

// Journal destructor

Journal::~Journal(void)
{
    RELMEM(subdir);
    while (firstentry != NULL)
        deleteentry(firstentry);
    while (nextjournal != NULL) {
        Journal* j = nextjournal;
        nextjournal = j->nextjournal;
```

journal.cpp 2

```
        delete j;
    }
}

// find or create new entry

Entry* Journal::getentry(const Action action, const char* entryname, const TimeStamp& ts,
EntryType type, int mask)
{
    Entry* e;
    Entry* p;
    int compare;

    compare = 1;
    for (e = firstentry, p = NULL; e != NULL; p = e, e = e->nextentry) {
        if ((compare = namecomp(e->entryname, entryname)) != 0)
            ; // done
        else if ((compare = comparetimes(e->timemodified, ts)) != 0)
            ; // done
        else if ((compare = e->type - type) != 0)
            ; // done
        else if ((compare = e->action - action) != 0)
            ; // done
        if (compare >= 0)
            break;
    }
    // protect against inability to set directory timestamps
    // by using prior creation event at this site, if it is there
    if (compare != 0 && type == ET_DIR && action == CA_ADD &&
      p != NULL && namecomp(entryname, p->entryname) == 0) {
        for (e = p; e != NULL && (e->listmask & mask) == 0; e = e->preventryforfile())
            ;
        if (e != NULL)
            compare = 0;
    }
    if (compare != 0) {
        e = new Entry(action, entryname, ts, type);
        if (p == NULL) {
            e->nextentry = firstentry;
            firstentry = e;
        }
        else {
            e->nextentry = p->nextentry;
            p->nextentry = e;
        }
        e->preventry = p;
        if (e->nextentry != NULL)
            e->nextentry->preventry = e;
    }
    if ((e->listmask & mask) == 0)
        e->makelisted(mask, writemask);
    return e;

}

// delete entry from journal

void Journal::deleteentry(Entry* e)
{
    Entry* p = e->preventry;
    Entry* n = e->nextentry;
    if (p == NULL)
        firstentry = n;
```

journal.cpp 3

```
    else
        p->nextentry = n;
    if (n != NULL)
        n->preventry = p;
    delete e;
}

// parse journal header line

BOOL Journal::parseheader(const char* buff, const char* &sitename)
{
    const char* scan;
    char sbuff[256];
    char* stuff;

    scan = skipprefix(jheader, buff);
    if (scan == NULL)
        return FALSE;

    // get sitename
    while (*scan == ' ') scan++;
    stuff = sbuff;
    while (*scan != '\0' && !isspace(*scan))
        *stuff++ = *scan++;
    *stuff = '\0';
    GETCOPY(sitename, sbuff);

    return TRUE;
}

// read journal file

BOOL Journal::readjournal(Site* s)
{
    char buff[256];
    Journal* k = NULL;  // current subdirectory being read
    const char* scan;
    const char* sitename = NULL;
    const char* elementname;
    Entry* e;
    const char* errmsg;
    int known;
    FILE* journalfile;

    if (s->isreadable() &&
      (journalfile = s->openjournal(subdir, "r")) != NULL) {
        *buff = '\0';
        while (fgets(buff, sizeof buff, journalfile) != NULL) {
            errmsg = NULL;

            // handle header line(s)
            if (parseheader(buff, sitename)) {
                if (k == NULL) {         // this establishes the root
                    k = this;
                    s->setsitename(sitename);
                }
                else {            // this switches to some subdirectory
                    k->writemask = 0;
                    scan = skipprefix(s->getsitename(), sitename);
                    if (scan == NULL) {
                        s->complainaboutjournalfile(subdir, "not within subtree", buff);
                        if (journalfile != stdin)
                            fclose(journalfile);
```

journal.cpp 4

```
                            return FALSE;
                    }
                    k = this;
                    while (getfirstpathelement(scan, elementname)) {
                        for (e = k->firstentry; e != NULL; e = e->nextentry) {
                            e = e->lastentryforfile();
                            if (namecomp(elementname, e->entryname) == 0)
                                break;
                        }
                        if (e != NULL && !e->islisted(s))
                            e = e->prevlistedentry(s);
                        if (e == NULL || e->type != ET_DIR) {
                            s->complainaboutjournalfile(k->subdir, "not listed as a subdir
ectory in journal", buff);
                            if (journalfile != stdin)
                                fclose(journalfile);
                            RELMEM(elementname);
                            RELMEM(sitename);
                            return FALSE;
                        }
                        if (e->child == NULL)
                            e->makechild(GETPATHNAME(NULL, k->subdir, elementname));
                        k = e->child;
                        RELMEM(elementname);
                    }
                }
                RELMEM(sitename);
                known = -1;
            }
            else if (k == NULL)
                errmsg = "missing journal header";

            // handle known site lines (including acks)
            else if (KnownSite::parseknown(buff, errmsg, known))
                ;

            // handle entries
            else if (Entry::parseentry(buff, errmsg, s, this))
                ;

            else
                errmsg = "unrecognized line in journal file";
            if (errmsg != NULL) {
                s->complainaboutjournalfile(subdir, errmsg, buff);
                if (journalfile != stdin)
                    fclose(journalfile);
                return FALSE;
            }
            for (;;) { // skip to end of long line
                for (scan = buff; *scan != '\n' && *scan != '\0'; scan++) ;
                if (*scan == '\n') break;
                if (fgets(buff, sizeof buff, journalfile) == NULL) break;
                scan = buff;
            }
        }
        k->writemask = 0;
        if (journalfile != stdin)
            fclose(journalfile);
    }
    readdirectory(s);
    return TRUE;
}
```

8

93/05/11 14:26:03 journal.cpp 5

```
// update journal by scanning actual directory

BOOL Journal::readdirectory(Site* s)
{
    Entry* e;
    DIR* cursor;
    char* name;
    EntryType filetype;
    TimeStamp ts;
    const char* dirpath;
    struct dirent* de;
    int result;
    const char* pathname;
    struct stat sb;

    if (!s->islocal())
        return FALSE;
    dirpath = GETPATHNAME(s->getrootname(), subdir, NULL);
    cursor = opendir((char*)dirpath);
    if (cursor == NULL)
        FileSystemMessage("read directory", dirpath);
    RELMEM(dirpath);
    if (cursor == NULL)
        return FALSE;
    while ((de = readdir(cursor)) != NULL) { // directory scan
        if (strcmp(de->d_name, ".") == 0 ||
            strcmp(de->d_name, "..") == 0 ||
            namecomp(de->d_name, JOURNALFILE) == 0)
            continue;
        name = de->d_name;
        pathname = GETPATHNAME(s->getrootname(), subdir, name);
        result = lstat(pathname, &sb);
        if (result != 0) {
            FileSystemMessage("find file", pathname);
            RELMEM(pathname);
            continue;
        }
        RELMEM(pathname);
        switch ((sb.st_mode & S_IFMT)) {
        case S_IFDIR: filetype = ET_DIR; break;
#ifndef __MSDOS__
        case S_IFLNK: filetype = ET_LINK; break;
#endif // __MSDOS__
        default: filetype = ET_FILE;
        }
        ts.stamptime(sb.st_mtime);

        e = getentry(CA_ADD, name, ts, filetype, s->getmask());
        e->setsure(s->getmask());
        if (e->type == ET_DIR) {
            if (e->child == NULL)
                e->makechild(GETPATHNAME(NULL, subdir, name));
        }
        // this entry exists, so subsequent entries are irrelevant
        // this happens when a previously missing file appears
        while ((e = e->nextentryforfile()) != NULL) {
            if (e->islisted(s)) {
                e->makeunlisted(s->getmask(), writemask);
                if (e->listmask == 0)
                    deleteentry(e);
            }
        }
```

93/05/11 14:26:03 journal.cpp 6

```
    } // end of directory scan
    closedir(cursor);
    inferdeletions(s);
    return TRUE;
}

// Post-scan after reading directory, finding unmatched journal entries.
// Lack of a matching actualentry is used to infer a deletion.

BOOL Journal::inferdeletions(Site* s)
{
    Entry* e;

    for (e = firstentry; e != NULL; e = e->nextentry) {
        if (!e->isconfirmed(s) && e->islisted(s) && e->overridingentry(s) == NULL) {
            // in local journal, but not directory
            if (e->action == CA_ADD) {
                e = getentry(CA_GON, e->entryname, now, e->type, s->getmask());
                ASSERT(e->overridingentry(s) == NULL);
            }
        }
    }
    return TRUE;
}

// combine subdirectories (subsidiary routine for adoptchildren)

void Journal::combinejournals(Journal* other)
{
    Entry* f;
    Entry* g;
    int savemask = 0;

    while ((f = other->firstentry) != NULL) {
        savemask = writemask;
        g = getentry(f->action, f->entryname, f->timemodified, f->type, f->listmask);
        writemask = savemask;
        g->adoptchildren(f);
        other->deleteentry(f);
    }
}

// find and combine compatible subdirectories with different timestamps

// Since it seems to be impossible to duplicate timestamps on
// subdirectories (utime doesn't work, at least in DOS), they are
// liable to have different timestamps.  This really doesn't matter
// as long as we can compensate for it by ignoring minor timestamp
// differences on directories.  That is the purpose of this routine.

void Journal::combinesubdirs(void)
{
    Entry* e;
    Entry* n;
    int savemask;

    for (e = firstentry; e != NULL; e = e->nextentry) {
        while ((n = e->nextentryforfile()) != NULL
         && (e->listmask & n->listmask) == 0
         && e->type == n->type
         && e->action == n->action
         && (e->action == CA_GON || e->type == ET_DIR)) {
            savemask = writemask;
```

93/05/11 14:26:03 journal.cpp 7

```
            e->makelisted(n->listmask, writemask);
            e->adoptchildren(n);
            deleteentry(n);
            writemask = savemask;
        }
    }
}

// reconcile sites

void Journal::reconcile(void)
{
    Site* s;    // source site (must be local)
    Site* x;    // source site (may be remote, same as s if s!= NULL)
    Site* t;    // target site
    Entry* e;
    Entry* q;
    const char* targetname;
    const char* sourcename;
    struct stat sb;
    char* buffer;
    int buffsize;

    for (e = firstentry; e != NULL; e = e->nextentry) {
        e = e->lastentryforfile();

        for (t = Site::getfirstsite(); t != NULL; t = t->getnextsite()) {
            if (!e->islisted(t) && t->istarget()) {
                x = NULL;
                for (s = Site::getfirstsite(); s != NULL; s = s->getnextsite()) {
                    if ((e->listmask & s->getmask()) != 0) {
                        x = s;
                        if (s->islocal())
                            break;
                    }
                }
                ASSERT(x != NULL); // entry wouldn't exist with no sites at all
                ASSERT(s == x || s == NULL);
                sourcename = GETPATHNAME(x->getrootname(), subdir, e->entryname);
                targetname = GETPATHNAME(t->getrootname(), subdir, e->entryname);

                q = e->prevlistedentry(t);
                if (q != NULL && !q->isconnected(e)) {
                    WarningMessage("conflict:  %s would override %s", sourcename, targetna
me);
                    RELMEM(targetname);
                    RELMEM(sourcename);
                    continue;
                }
                if (noupdate) {
                    RELMEM(targetname);
                    RELMEM(sourcename);
                    continue;
                }
                switch(e->action) {

                case CA_ADD:

                    if (s != NULL && t->isupdatable()) {

                        switch(e->type) {
                        case ET_FILE:
                            InfoMessage("copy file", sourcename, targetname);
```

93/05/11 14:26:03 journal.cpp 8

```
                            if (copyfile(sourcename, targetname))
                                e->makelisted(t->getmask(), writemask);
                            break;
                        case ET_DIR:
                            InfoMessage("copy directory", sourcename, targetname);
                            if (
                              getattributes(sourcename, &sb) &&
                              createsubdir(targetname, &sb))
                                e->makelisted(t->getmask(), writemask);
                            break;
                        case ET_LINK:
                            getbuffer(buffer, buffsize);
                            InfoMessage("copy symlink", sourcename, targetname);
                            if (
                              readsymlink(sourcename, buffer, buffsize, &sb) &&
                              createlink(targetname, buffer, &sb))
                                e->makelisted(t->getmask(), writemask);
                            relbuffer(buffer);
                            break;
                        default:
                            FAILURE;
                        }
                    }
                    break;

                case CA_GON:

                    if (q == NULL || q->action == CA_GON)
                        e->makelisted(t->getmask(), writemask);
                    else if (t->isupdatable()) {
                        switch(e->type) {
                        case ET_FILE:
                            InfoMessage("delete file", NULL, targetname);
                            if (rmfile(targetname))
                                e->makelisted(t->getmask(), writemask);
                            break;
                        case ET_DIR:
                            InfoMessage("delete subdirectory", NULL, targetname);
                            if (rmsubdir(targetname))
                                e->makelisted(t->getmask(), writemask);
                            break;
                        case ET_LINK:
                            InfoMessage("delete symlink", NULL, targetname);
                            if (rmlink(targetname))
                                e->makelisted(t->getmask(), writemask);
                            break;
                        default:
                            FAILURE;
                        }
                    }
                    break;

                default:
                    FAILURE;
                }
                RELMEM(targetname);
                RELMEM(sourcename);
            } // listed in local update directory
        }  // for t ...
    }
}

// write journal file
```

journal.cpp 9

```
void Journal::writejournal(Site* s, BOOL toplevel)
{
    const char* sitename;
    Entry* e;
    Entry* q;
    Action action;
    FILE* journalfile;

    if (!s->iswritable())
        return;
    journalfile = s->openjournal(subdir,
        (s->islocal() || toplevel) ? "w" : "a");
    if (journalfile == NULL) {
        s->complainaboutjournalfile(subdir, "can't write", strerror(errno));
        s->donotwrite();
        return;
    }

    sitename = GETPATHNAME(s->getsitename(), subdir, NULL);
    fprintf(journalfile, "%s %s - %s\n", jheader, sitename, version);
    RELMEM(sitename);

    for (e = firstentry; e != NULL; e = e->nextentry) {
        if (e->islisted(s) || !s->issource()) {
            q = e->overridingentry(s);
            if (q == NULL && e->action == CA_CON)
                q = e;  // so comparetimes below will test e itself
            if (q == NULL || comparetimes(q->timemodified, s->getacktime()) > 0) {
                e->writeentry(journalfile, e->action);
            }
        }
        else if (e->nextentryforfile() == NULL) {
            q = e->prevlistedentry(s);
            if (q != NULL && !q->isconnected(e))
                action = CA_ERR;
            else if (e->action == CA_ADD)
                action = CA_GET;
            else if (e->action == CA_DON)
                action = CA_DEL;
            else
                FAILURE;
            e->writeentry(journalfile, action);
        }
    }

    if (toplevel)
        KnownSite::writeknownsites(journalfile);
    if (journalfile != stdout)
        fclose(journalfile);
}

// capture children for later processing

void Journal::capturechildren(Journal* &journalstobedone)
{
    Entry* e;

    for (e = firstentry; e != NULL; e = e->nextentry) {
        if (e->child != NULL) {
            ASSERT(e->child->nextjournal == NULL);
            e->child->nextjournal = journalstobedone;
            journalstobedone = e->grabchild();
```

journal.cpp 10

```
            }
        }
}

// do all processing for one journal

void Journal::processjournal(BOOL toplevel, Journal*& journalstobedone)
{
    Site* s;
    Site* r;
    const char* sitename = NULL;

    for (s = Site::getfirstsite(); s != NULL; s = s->getnextsite()) {
        if (toplevel || s->islocal())
            readjournal(s);
        if (s->getsitename() != NULL)
            sitename = s->getsitename();
    }

    if (toplevel) {
        for (s = Site::getfirstsite(); s != NULL; s = s->getnextsite()) {
            s->setsitename(sitename);
            if (s->istarget())
                KnownSite::reconciliationtarget(s->getsitename());
        }

        for (s = Site::getfirstsite(); s != NULL; s = s->getnextsite()) {
            if (s->istarget()) {
                for (r = Site::getfirstsite(); r != NULL; r = r->getnextsite()) {
                    if (r != s && s->issource())
                        KnownSite::acknowlege(s->getsitename(), r->getsitename());
                }
                s->setacktime(KnownSite::getacktime(s->getsitename()));
            }
        }
        KnownSite::killoldsites();
    }

    combinesubdirs();
    reconcile();
    for (s = Site::getfirstsite(); s != NULL; s = s->getnextsite()) {
        if (s->iswritable() && (toplevel || !s->islocal() || ((writemask & s->getmask()) !
= 0)))
            writejournal(s, toplevel);
    }

    capturechildren(journalstobedone);
}
```

knownsit.cpp 1

```
/////////////////////////////////////////////////////////////////////
//                                                                 //
// knownsit.cpp - defines list of known sites                      //
//                                                                 //
/////////////////////////////////////////////////////////////////////

// -------- includes --------

#include "stddef.h"
#include "stdio.h"
#include "time.h"

#include "reconcil.h"
#include "myalloc.h"
#include "timestmp.h"
#include "parse.h"
#include "knownsit.h"

// -------- global data --------

int KnownSite::nknown = 0;
KnownSite* KnownSite::known = NULL;
TimeStamp* KnownSite::ack = NULL;

// -------- KnownSite code --------

// look up by name, not creating if not found

int KnownSite::findknownsite(const char* sname)
{
    int k;
    int c;

    for (k = 0; k < nknown; k++) {
        c = namecomp(known[k].sitename, sname);
        if (c == 0)
            return k;
    }
    return -1;
}

// look up by name, creating if not found

int KnownSite::makeknownsite(const char* sname)
{
    int k;
    int i;
    int j;
    KnownSite* oldknown;
    TimeStamp* oldack;

    k = findknownsite(sname);
    if (k < 0) {
        k = nknown;
        oldknown = known;
        known = NULL;
        oldack = ack;
        ack = NULL;
        nknown++;
        getmem((void**)&known, nknown * sizeof(KnownSite), __FILE__, __LINE__);
```

knownsit.cpp 2

```
        getmem((void**)&ack, nknown * nknown * sizeof(TimeStamp), __FILE__, __LINE__);
        for (i = 0; i < nknown - 1; i++) {
            known[i].sitename = oldknown[i].sitename;
            oldknown[i].sitename = NULL;
            known[i].killed = oldknown[i].killed;
            for (j = 0; j < nknown - 1; j++) {
                ack[i * nknown + j] = oldack[i * (nknown - 1) + j];
            }
            ack[i * nknown + k].reset();  // i hasn't heard from k
            ack[k * nknown + i].reset();  // k hasn't heard from i
        }
        known[k].sitename = COPYSTRING(sname);
        known[k].killed = FALSE;
        ack[k * nknown + k].reset();
        if (nknown > 1) {
            RELMEM(oldknown);
            RELMEM(oldack);
        }
    }
    return k;
}

// parse known site
//    known sites return k for subsequent acks

BOOL KnownSite::parseknown(const char* buff, const char*& errmsg, int& k)
{
    const char* scan;
    char word[65];
    TimeStamp ts;
    int j;

    if ((scan = skipprefix("Known site", buff)) != NULL) {

        scan = getword(scan, word, sizeof word);
        k = makeknownsite(word);

        scan = getword(scan, word, sizeof word);
        if (!ts.parsedate(word)) {
            errmsg = "wrong date format";
            return FALSE;
        }

        scan = getword(scan, word, sizeof word);
        if (!ts.parsetime(word)) {
            errmsg = "wrong time format";
            return FALSE;
        }

        if (comparetimes(ack[k * nknown + k], ts) < 0)
            ack[k * nknown + k] = ts;
        return TRUE;
    }
    else if ((scan = skipprefix("$", buff)) != NULL) {

        scan = getword(scan, word, sizeof word);
        if (!ts.parsedate(word)) {
            errmsg = "wrong date format";
            return FALSE;
        }

        scan = getword(scan, word, sizeof word);
        if (!ts.parsetime(word)) {
```

93/05/11 14:26:45 knownsit.cpp 3

```
            errmsg = "wrong time format";
            return FALSE;
        }

        scan = getword(scan, word, sizeof word);
        k = makeknownsite(word);

        if (comparetimes(ack[k * nknown + k], ts) < 0)
            ack[k * nknown + k] = ts;
        return TRUE;
    }

    else if ((scan = skipprefix("Ack", buff)) != NULL) {

        scan = getword(scan, word, sizeof word);
        j = makeknownsite(word);

        scan = getword(scan, word, sizeof word);
        if (!ts.parsedate(word)) {
            errmsg = "wrong date format";
            return FALSE;
        }

        scan = getword(scan, word, sizeof word);
        if (!ts.parsetime(word)) {
            errmsg = "wrong time format";
            return FALSE;
        }

        ASSERT(k >= 0 && k < nknown);
        internalack(k, j, ts);

        return TRUE;
    }
    else if ((scan = skipprefix(". ", buff)) != NULL) {

        scan = getword(scan, word, sizeof word);
        if (!ts.parsedate(word)) {
            errmsg = "wrong date format";
            return FALSE;
        }

        scan = getword(scan, word, sizeof word);
        if (!ts.parsetime(word)) {
            errmsg = "wrong time format";
            return FALSE;
        }

        scan = getword(scan, word, sizeof word);
        j = makeknownsite(word);

        ASSERT(k >= 0 && k < nknown);
        internalack(k, j, ts);

        return TRUE;
    }
    else
        return FALSE;
}

// acknowlege (internal version)
//   indicates that site k knows about j up to time tkj
```

93/05/11 14:26:45 knownsit.cpp 4

```
void KnownSite::internalack(int k, int j, TimeStamp& tkj)
{
    if (comparetimes(ack[k * nknown + j], tkj) < 0)
        ack[k * nknown + j] = tkj;
}

// acknowlege (sname has received information from rname)

void KnownSite::acknowlege(const char* sname, const char* rname)
{
    int k = makeknownsite(sname);
    int j = makeknownsite(rname);
    internalack(k, j, ack[j * nknown + j]);
}

// this site is target of a reconciliation

void KnownSite::reconciliationtarget(const char* sname)
{
    int k = makeknownsite(sname);
    int j;

    ack[k * nknown + k] = now;
    for (j = 0; j < nknown; j++) {
        internalack(k, j, ack[j * nknown + j]);
    }
}

// kill site by name

void KnownSite::killsite(const char *sname)
{
    int k = makeknownsite(sname);
    known[k].killed = TRUE;
}

// kill old sites

void KnownSite::killoldsites(void)
{
    int k;
    TimeStamp warndate;
    TimeStamp killdate;

    warndate.getpast(1);
    killdate.getpast(2);
    for (k = 0; k < nknown; k++) {
        if (comparetimes(killdate, ack[k * nknown + k]) >= 0) {
            WarningMessage("Site %s abandoned", known[k].sitename);
            known[k].killed = TRUE;
        }
        else if (comparetimes(warndate, ack[k * nknown + k]) >= 0) {
            WarningMessage("Site %s will be abandoned on %s", known[k].sitename, killdate.
showdate());
        }
    }
}

// get time acknowledged by all known sites to given site

TimeStamp KnownSite::getacktime(const char* sname)
{
    int k;
```

93/05/11 14:26:45 knownsit.cpp 5

```
    int j;
    TimeStamp ts;

    j = makeknownsite(sname);
    ts = now;
    for (k = 0; k < nknown; k++) {
        if (!known[k].killed && comparetimes(ts, ack[k * nknown + j]) > 0)
            ts = ack[k * nknown + j];
    }
    return ts;
}

// write known sites to journal

void KnownSite::writeknownsites(FILE* journalfile)
{
    int k;
    int j;

    for (k = 0; k < nknown; k++) {
        if (!known[k].killed) {
            fprintf(journalfile, "S %s %s %s\n",
                ack[k * nknown + k].showdate(),
                ack[k * nknown + k].showtime(),
                known[k].sitename);
            for (j = 0; j < nknown; j++) {
                if (j != k && !known[j].killed) {
                    if (!ack[k * nknown + j].neverset()) {
                        fprintf(journalfile, "- %s %s %s\n",
                            ack[k * nknown + j].showdate(),
                            ack[k * nknown + j].showtime(),
                            known[j].sitename);
                    }
                }
            }
        }
    }
}

// clean up known sites at end of run

void KnownSite::resetknownsites(void)
{
    int k;

    for (k = 0; k < nknown; k++) {
        RELMEM(known[k].sitename);
    }
    if (nknown > 0) {
        RELMEM(known);
        RELMEM(ack);
    }
    nknown = 0;
}

// constructor

KnownSite::KnownSite(void)
{
    sitename = NULL;
    killed = FALSE;
}
```

93/05/11 14:26:45 knownsit.cpp 6

```
// destructor

KnownSite::~KnownSite(void)
{
    if (sitename != NULL)
        RELMEM(sitename);
}
```

myalloc.cpp 1

```
//////////////////////////////////////////////////////////////////////////
//                                                                      //
// myalloc.cpp - safe memory allocation & core leak detection           //
//                                                                      //
//////////////////////////////////////////////////////////////////////////


// -------- includes --------

#include "stdlib.h"
#include "stdio.h"
#include "string.h"

#include "myalloc.h"
#include "reconcil.h"


// -------- internals --------

// define __DEBUG__ALLOCATIONS__ to compile with extra checking
#define __DEBUG__ALLOCATIONS__

#ifdef __DEBUG__ALLOCATIONS__
typedef struct MemoryBlock {
    struct MemoryBlock *next;
    const char *sourcefile;        // __FILE__ where allocated
    int sourceline;                // __LINE__ where allocated
    char firstbyte;                // initial byte of allocated storage
} MemoryBlock;
static MemoryBlock *firstmemoryblock = NULL;
#endif // __DEBUG__ALLOCATIONS__

static int blocksallocated = 0;


// -------- safe allocation & leak detection --------

// allocate memory block

void getmem(void **something, const int size, const char *sourcefile, const int sourceline
)
{

#ifdef __DEBUG__ALLOCATIONS__
    MemoryBlock *dat;
#endif // __DEBUG__ALLOCATIONS__

    if (*something != NULL) {
        fprintf(stderr, "Allocated over object:  file \"%s\", line %d\n", sourcefile, sour
celine);
        exit(1);
    }

#ifdef __DEBUG__ALLOCATIONS__

    dat = (MemoryBlock *)malloc(size + sizeof(MemoryBlock) - 1);
    if (dat == NULL) {
        fprintf(stderr, "Out of memory\n");
        exit(1);
    }
    dat->next = firstmemoryblock;
    firstmemoryblock = dat;
    dat->sourcefile = sourcefile;
```

myalloc.cpp 2

```
    dat->sourceline = sourceline;
    *something = (void *)&dat->firstbyte;

#else // __DEBUG__ALLOCATIONS__

    *something = malloc(size);
    if (*something == NULL) {
        fprintf(stderr, "Out of memory\n");
        exit(1);
    }
#endif // __DEBUG__ALLOCATIONS__
    blocksallocated += 1;
}

// copy a string into allocated space

void getcopy(void **dat, const char *src, const char *sourcefile, const int sourceline)
{
    char *cpy = NULL;

    if (*dat != NULL) {
        fprintf(stderr, "Copied over object:  file \"%s\", line %d\n", sourcefile, sourcel
ine);
        exit(1);
    }
    getmem((void **)&cpy, strlen(src) + 1, sourcefile, sourceline);
    strcpy(cpy, src);
    *dat = cpy;
}

// release previously allocated block

void relmem(void **something, const char *sourcefile, const int sourceline)
{

#ifdef __DEBUG__ALLOCATIONS__

    MemoryBlock **prevptr;
    MemoryBlock *src;

#endif // __DEBUG__ALLOCATIONS__

    if (*something == NULL)  {
        fprintf(stderr, "Released null object:  file \"%s\", line %d\n", sourcefile, sourc
eline);
        exit(1);
    }
    blocksallocated -= 1;
    if (blocksallocated < 0) {
        fprintf(stderr, "Released more objects than allocated:  file \"%s\", line %d\n", s
ourcefile, sourceline);
        exit(1);
    }

#ifdef __DEBUG__ALLOCATIONS__

    for (prevptr = &firstmemoryblock; *prevptr != NULL && (void *)&(*prevptr)->firstbyte !
= *something; prevptr = &(*prevptr)->next) ;
    if (*prevptr == NULL) {
        fprintf(stderr, "Released non-allocated object:  file \"%s\", line %d\n", sourcefi
le, sourceline);
        exit(1);
    }
```

myalloc.cpp 3

```
    src = *prevptr;
    *prevptr = src->next;
    free(src);

#else // __DEBUG__ALLOCATIONS__

    free(*something);

#endif // __DEBUG__ALLOCATIONS__

    *something = NULL;
}

// append string2 to string1, reallocating

char *appendstring(const char *string1, const char *string2, const char *sourcefile, const
 int sourceline)
{
    char *dat = NULL;
    int n = strlen(string1);

    getmem((void **)&dat, n + strlen(string2) + 1, sourcefile, sourceline);
    strcpy(dat, string1);
    strcpy(dat + n, string2);
    RELMEM(string1);
    return dat;
}

// copy string to allocated space

char *copystring(const char *source, const char *sourcefile, const int sourceline)
{
    char *dat = NULL;
    getcopy((void **)&dat, source, sourcefile, sourceline);
    return dat;
}

// verify that everything allocated was freed

void verifyeverythingfreed(void)
{

#ifdef __DEBUG__ALLOCATIONS__

    MemoryBlock *mb;

    if (firstmemoryblock != NULL) {
        fprintf(stderr, "The following were not freed:\n");
        for (mb = firstmemoryblock; mb != NULL; mb = mb->next)
            fprintf(stderr, "  memory block allocated at file \"%s\", line %d\n", mb->sour
cefile, mb->sourceline);
        exit(0);
    }

#endif // __DEBUG__ALLOCATIONS__

    ASSERT(blocksallocated == 0);
}


// -------- large buffer allocation ---------
```

myalloc.cpp 4

```
void getbuffer(char*& buffer, int& buffsize)
{
    char *extra;

    extra = (char *)malloc(4096);
    if (extra == NULL)
        FatalMessage("No memory for buffer");
    for (buffsize = 16384; (buffer = (char *)malloc(buffsize)) == NULL; buffsize -= 4096)
{
        if (buffsize <= 0)
            FatalMessage("No memory for buffer");
    }
    free(extra);
}

void relbuffer(char*& buffer)
{
    free(buffer);
}
```

93/05/11 14:27:42 parse.cpp 1

```
//////////////////////////////////////////////////////////////////////
//                                                                  //
// parse.cpp - parsing routines                                     //
//                                                                  //
//////////////////////////////////////////////////////////////////////

// -------- includes --------

#include "stddef.h"

#include "ctype.h"
#include "parse.h"


// -------- parsing routines --------

// extract one word scanned string - up to next space

const char *getword(const char *scan, char *buff, int size)
{
    char *limit = buff + size - 1;
    while (isspace(*scan)) scan++;
    while (!isspace(*scan) && *scan != '\0') {
        if (buff < limit)
            *buff++ = *scan++;
    }
    *buff++ = '\0';
    return scan;
}

// compare prefix and return pointer to remainder

const char *skipprefix(const char *prefix, const char *string)
{
    while (*prefix != '\0' && *string == *prefix) {
        string++;
        prefix++;
    }
    return (*prefix != '\0') ? NULL : string;
}

// compare two names ignoring case (in DOS), honoring case (in Unix)

#ifdef __MSDOS__
#define FIXCASE(c) (isupper(c) ? tolower(c) : c)
#else // __MSDOS__
#define FIXCASE(c) (c)
#endif // __MSDOS__

int namecomp(const char *string1, const char *string2)
{
    for (;FIXCASE(*string1) == FIXCASE(*string2); string1++, string2++)
        if (*string1 == '\0')
            return 0;
    return FIXCASE(*string1) - FIXCASE(*string2);
}

// find next "word" (anything surrounded by white space) in input line

char *nextword(char *buff)
{
    char *scan = buff;
```

93/05/11 14:27:42 parse.cpp 2

```
    while (*scan && isspace(*scan))
        scan++;
    while (!isspace(*scan) && *scan != '\n')
        scan++;
    return scan;
}
```

93/05/11 14:29:28 reconcil.cpp 1

```
//////////////////////////////////////////////////////////////////////
//                                                                  //
// reconcile.cpp - main program for directory reconciliation        //
//                                                                  //
//                                                                  //
// This module contains the programs user interface, consisting of  //
// line parsing, message generation, and global parameter variables. //
//                                                                  //
// It also contains the top-level routine, which reads, updates,    //
// reconciles, and writes the journals at the specified sites.      //
//                                                                  //
//////////////////////////////////////////////////////////////////////

// -------- includes --------

#include "stdlib.h"
#include "stdio.h"
#include "sys/types.h"
#include "time.h"
#include "string.h"
#include "dirent.h"
#include "sys/stat.h"
#include "stdarg.h"

#include "reconcil.h"
#include "myalloc.h"
#include "timestmp.h"
#include "site.h"
#include "knownsit.h"
#include "entry.h"
#include "journal.h"


// -------- global and static information --------

char* version = "reconcile compiled " __DATE__;

// globally accessible switches

BOOL quiet = FALSE;
BOOL noupdate = FALSE;
BOOL problems = FALSE;


// -------- top level routine --------

// read, update, reconcile, and write journals

static void dosites(void)
{
    Journal* j;
    Journal* journalstobedone;
    BOOL toplevel;

    toplevel = TRUE;
    journalstobedone = new Journal(COPYSTRING(""));
    while (journalstobedone != NULL) {
        j = journalstobedone;
        journalstobedone = j->grabnextjournal();

        j->processjournal(toplevel, journalstobedone);

        delete j;
```

93/05/11 14:29:28 reconcil.cpp 2

```
        toplevel = FALSE;
    }
}


// -------- messages to the user --------

// non-error message "[would] verb from source to target"

void InfoMessage(const char* verb, const char* source, const char* target)
{
    if (!quiet) {
        if (noupdate)
            fprintf(stderr, "would ");
        fprintf(stderr, "%s", verb);
        if (source != NULL) {
            fprintf(stderr, " from %s", source);
            if (target != NULL)
                fprintf(stderr, " to");
        }
        if (target != NULL)
            fprintf(stderr, " %s", target);
        fprintf(stderr, "\n");
    }
}

// warning message - program continues

void WarningMessage(const char* message, ...)
{
    va_list args;

    va_start(args, message);
    vfprintf(stderr, message, args);
    va_end(args);
    fprintf(stderr, "\n");
    problems = TRUE;
}

// warning message - error doing system operation

void FileSystemMessage(const char* verb, const char* filename)
{
    char* errmsg;
    if (errno >= sys_nerr || errno < 0)
        errmsg = "unknown error number";
    else
        errmsg = sys_errlist[errno];

    WarningMessage("Unable to %s %s - %s", verb, filename, errmsg);
}

// fatal error message - program exits

void FatalMessage(const char* message, ...)
{
    va_list args;

    va_start(args, message);
    fprintf(stderr, "FATAL ERROR:\n  ");
    vfprintf(stderr, message, args);
    va_end(args);
    fprintf(stderr, "\n  %s exiting\n", version);
```

13 reconcil.cpp 3

```
    exit(1);
}

// error message - internal problem - program exits

void AssertionFailed(const char* file, const int line)
{
    fprintf(stderr, "FATAL ERROR:  program error in %s:%d\n", file, line);
    fprintf(stderr, "%s exiting\n", version);
    exit(2);
}

// tell user about program parameters

static void tell(void)
{
    fprintf(stderr,     "\nsyntax:  reconcile [-options] [[-mode] [directory | file]] ..\n
");
    fprintf(stderr,     "\n");
    fprintf(stderr,     "  directory - use a local directory and its internal journal\n");
    fprintf(stderr,     "  file - use an external journal file, or '-' for standard input/
output\n");
    fprintf(stderr,     "  if no directory or file is given, "." is used\n");
    fprintf(stderr,     "\n");
    fprintf(stderr,     " -[mode]\n");
    fprintf(stderr,     "       r - don't write new journal\n");
    fprintf(stderr,     "       w - don't read existing journal\n");
    fprintf(stderr,     "       o - don't update files in this directory\n");
    fprintf(stderr,     "\n");
    fprintf(stderr,     "[-options]\n");
    fprintf(stderr,     "  -n   no file updating (OK to update journals)\n");
    fprintf(stderr,     "  -q   quiet - print only error messages\n");
    fprintf(stderr,     "  -h   print this help text, do nothing else\n");
    fprintf(stderr,     "  -a sitename - abandon site\n");
}


// -------- parameter parsing --------

// create new site given directory or file name

void makenewsite(BOOL rmode, BOOL wmode, BOOL omode, const char* scan)
{
    struct stat sb;

    if (scan[0] == '-' && scan[1] == '\0')
        sb.st_mode = S_IFREG;
    else if (stat(scan, &sb) < 0) {
        if (wmode) // not found and write only means create a file
            sb.st_mode = S_IFREG;
        else {
            FileSystemMessage("find", scan);
            return;
        }
    }
    switch ((sb.st_mode & S_IFMT)) {
    case S_IFREG:
        new RemoteSite(scan, rmode, wmode);
        break;
    case S_IFDIR:
        new LocalSite(scan, rmode, wmode, omode);
        break;
    default:
```

reconcil.cpp 4

```
        WarningMessage("%s is not a file or directory", scan);
        return;
    }
}

// parse program arguments

static void parseargs(int argc, char* argv[])
{
    int i;
    const char* scan;
    time_t timeNow;
    BOOL bDoTell;
    BOOL bGotDirectory;
    BOOL rmode;
    BOOL wmode;
    BOOL omode;

    bDoTell = FALSE;
    bGotDirectory = FALSE;
    rmode = wmode = omode = FALSE;
    now.stamptime(time(&timeNow));
    for (i = 1; i < argc; ) {
        scan = argv[i++];
        if (scan[0] == '-' && scan[1] != '\0') {
            scan++;
            while (scan[0] != '\0') {
                switch(*scan++) {
                    case 'r':
                        rmode = TRUE;
                        break;
                    case 'w':
                        wmode = TRUE;
                        break;
                    case 'o':
                        omode = TRUE;
                        break;
                    case 'q':
                        quiet = TRUE;
                        break;
                    case 'n':
                        noupdate = TRUE;
                        break;
                    case 'h':
                        tell();
                        exit(0);
                    case 'a':
                        if (scan[0] == '\0' && i < argc)
                            scan = argv[i++];
                        KnownSite::killsite(scan);
                        scan = "";
                        break;
                    default:
                        fprintf(stderr, "Unknown switch %c ignored.\n", scan[0]);
                }
            }
        }
        else {
            bGotDirectory = TRUE;
            makenewsite(rmode, wmode, omode, scan);
            rmode = wmode = omode = FALSE;
        }
    }
```

reconcil.cpp 5

```
    if (bDoTell) {
        tell();
        exit(1);
    }
    if (!bGotDirectory)
        makenewsite(rmode, wmode, omode, ".");
}

// main - command line interface

void main(int argc, char* argv[])
{
    // setup
    problems = FALSE;
    noupdate = FALSE;
    quiet = FALSE;
    parseargs(argc, argv);
    if (problems)
        exit(1);

    // run the program
    if (!quiet)
        fprintf(stderr, "%s\n", version);
    dosites();
    if (!problems && !quiet)
        fprintf(stderr, "Successful reconciliation\n");

    // cleanup
    Site::resetsites();
    KnownSite::resetknownsites();
    verifyeverythingfreed();

    exit(0);
}
```

site.cpp 1

```
//////////////////////////////////////////////////////////////////////
//                                                                  //
// site.cpp - description of a site being reconciled with others    //
//                                                                  //
// Defines the Site class, subclasses LocalSite and RemoteSite.     //
// Does all actual I/O is done LocalSite.                           //
//                                                                  //
//////////////////////////////////////////////////////////////////////


// -------- includes --------

#include "stdio.h"
#include "stdlib.h"
#include "time.h"
#include "ctype.h"
#include "string.h"

#include "reconcil.h"
#include "timestmp.h"
#include "site.h"
#include "myalloc.h"
#include "filesys.h"


// -------- Site code --------

Site* Site::firstsite = NULL;
int Site::nextmask = 1;

Site::Site(BOOL rmode, BOOL wmode)
{
    mask = nextmask;
    nextmask <<= 1;
    if (nextmask <= 0)
        FatalMessage("Too many different sites");
    nextsite = firstsite;
    sitename = NULL;
    writeonly = wmode;
    readonly = rmode;
    firstsite = this;
}

Site::~Site(void)
{
    if (sitename != NULL) RELMEM(sitename);
    if (nextsite != NULL)
        delete nextsite;
}

// define site name

// xxx needs to be fixed to make site names consistent

void Site::setsitename(const char* sitenamearg)
{
    if (sitename == NULL)
        GETCOPY(sitename, sitenamearg);
}


// -------- LocalSite code --------
```

14 site.cpp 2

```
// constructor

LocalSite::LocalSite(const char* name, BOOL rmode, BOOL wmode, BOOL omode)
  : Site(rmode, wmode)
{
    char path[_MAX_PATH];
    char drive[_MAX_DRIVE];
    char dir[_MAX_DIR];
    char file[_MAX_FNAME];
    char ext[_MAX_EXT];
    char label[14];
    char result[_MAX_PATH + 14];

    updateDir = !omode;
    rootname = NULL;
    GETCOPY(rootname, name);
    _fullpath(path, name, sizeof path);
    _splitpath(path, drive, dir, file, ext);
    getlabel(drive, label, sizeof label);
    _makepath(path, NULL, dir, file, ext);
    sprintf(result, "%s:%s", label, path);
    setsitename(result);
}

// destructor

LocalSite::~LocalSite(void)
{
    RELMEM(rootname);
}

// open journal file

FILE* LocalSite::openjournal(const char* subdir, const char* mode)
{
    FILE* journalfile;

    const char* pathname = GETPATHNAME(getrootname(), subdir, JOURNALFILE);
    journalfile = fopen(pathname, mode);
    RELMEM(pathname);
    return journalfile;
}

// complain about contents of journal file

void LocalSite::complainaboutjournalfile(const char* subdir, const char* message, const ch
ar* buff)
{
    const char* pathname = GETPATHNAME(getrootname(), subdir, JOURNALFILE);

    WarningMessage("%s %s:  %40s", pathname, message, buff);
    RELMEM(pathname);
}


// -------- RemoteSite code --------

RemoteSite::RemoteSite(const char* name, BOOL rmode, BOOL wmode)
  : Site(rmode, wmode)
{
    jnlname = NULL;
    GETCOPY(jnlname, name);
}
```

site.cpp 3

```
RemoteSite::~RemoteSite(void)
{
    if (jnlname != NULL) RELMEM(jnlname);
}

// open journal file

FILE* RemoteSite::openjournal(const char* subdir, const char* mode)
{
    if (strcmp(jnlname, "-") == 0) {
        switch(*mode) {
        case 'r': return stdin;
        case 'w': return stdout;
        default: FAILURE;
        }
    }
    subdir = subdir;    // prevent warning about subdir not used
    return fopen(jnlname, mode);
}

// complain about contents of journal file

void RemoteSite::complainaboutjournalfile(const char* subdir, const char* message, const c
har* buff)
{
    const char* pathname;

    if (strcmp(jnlname, "-") == 0)
        pathname = "(standard input)";
    else
        pathname = jnlname;
    WarningMessage("%s %s %s:  %s", pathname, subdir, message, buff);
}
```

timestmp.cpp 1

```
//////////////////////////////////////////////////////////////////////
//                                                                  //
// timestmp.cpp - time stamping and comparison                      //
//                                                                  //
// Defines class TimeStamp.                                         //
//                                                                  //
//////////////////////////////////////////////////////////////////////


// -------- includes --------

#include "time.h"

#include "reconcil.h"
#include "timestmp.h"

#define YEARSTART 1900
#define DECADE 80


// -------- globals --------

TimeStamp now;                          // time of this program run


// -------- TimeStamp code --------

// create new timestamp

TimeStamp::TimeStamp(void)
{
    reset();
}

// zero time stamp

void TimeStamp::reset(void)
{
    yr = 0;
    mo = 0;     // out of range which is 1..12
    dy = 0;     // out of range which is 1..31
    hr = 0;
    mn = 0;
    sc = 0;
}

// convert system time to a TimeStamp

void TimeStamp::stamptime(time_t systemtime)
{
    struct tm *tm = localtime(&systemtime);
    yr = tm->tm_year - DECADE;
    mo = tm->tm_mon + 1;
    dy = tm->tm_mday;
    hr = tm->tm_hour;
    mn = tm->tm_min;
    sc = tm->tm_sec;
}

// convert a TimeStamp to system time

time_t TimeStamp::gettime(void)
{
```

timestmp.cpp 2

```
    struct tm tm;
    time_t t;

    tm.tm_sec = sc;
    tm.tm_min = mn;
    tm.tm_hour = hr;
    tm.tm_mday = dy;
    tm.tm_mon = mo - 1;
    tm.tm_year = yr + DECADE;
    tm.tm_isdst = -1;
    t = mktime(&tm);
    if (t < 0)
        FatalMessage("Unable to compute time");
    return t;
}

// get 2-digit number

static BOOL get2digits(unsigned char *value, const char *buff)
{
    if (*buff < '0' || *buff > '9' || *(buff + 1) < '0' || *(buff + 1) > '9')
        return FALSE;
    *value = ((*buff - '0') * 10 + (*(buff + 1) - '0'));
    return TRUE;
}

// get date from buffer

BOOL TimeStamp::parsedate(const char* buff)
{
    unsigned char century, year, month, day;

    while (*buff == ' ') buff++;
    if (get2digits(&year, buff + 0) && *(buff + 2) == '/'
     && get2digits(&month, buff + 3) && *(buff + 5) == '/'
     && get2digits(&day, buff + 6) && *(buff + 8) == '\0') {
        yr = (year + 100 - DECADE) % 100;
        mo = month;
        dy = day;
        return TRUE;
    }
    if (get2digits(&century, buff)
     && get2digits(&year, buff + 2) && *(buff + 4) == '/'
     && get2digits(&month, buff + 5) && *(buff + 7) == '/'
     && get2digits(&day, buff + 8) && *(buff + 10) == '\0') {
        yr = year + century * 100 - YEARSTART;
        mo = month;
        dy = day;
        return TRUE;
    }
    return FALSE;
}

// get time from buffer

BOOL TimeStamp::parsetime(const char* buff)
{
    unsigned char hour, min, sec;
    if (get2digits(&hour, buff + 0) && *(buff + 2) == ':'
     && get2digits(&min, buff + 3) && *(buff + 5) == ':'
     && get2digits(&sec, buff + 6) && *(buff + 8) == '\0') {
        hr = hour;
        mn = min;
```

15 timestmp.cpp 3

```
        sc = sec;
        return TRUE;
    }
    return FALSE;
}

// put separator and two digits into buffer

static void put2digits(char* buff, int val)
{
    buff[0] = (val / 10) + '0';
    buff[1] = (val % 10) + '0';
}

// format date

char* TimeStamp::showdate(void)
{
    static char buff[11];
    char *bp = buff;

    if (yr / 100 != 0) {
        put2digits(bp, (yr + YEARSTART) / 100);
        bp += 2;
    }
    put2digits(bp + 0, (yr + YEARSTART) % 100);
    bp[2] = '/';
    put2digits(bp + 3, mo);
    bp[5] = '/';
    put2digits(bp + 6, dy);
    bp[8] = '\0';
    return buff;
}

// format time

char* TimeStamp::showtime(void)
{
    static char buff[9];

    put2digits(buff + 0, hr);
    buff[2] = ':';
    put2digits(buff + 3, mn);
    buff[5] = ':';
    put2digits(buff + 6, sc);
    buff[8] = '\0';
    return buff;
}

// compare two timestamps

int comparetimes(const TimeStamp& ts1, const TimeStamp& ts2)
{
    int c;
    if ((c = ts1.yr - ts2.yr) != 0)
        ; // no need to continue
    else if ((c = ts1.mo - ts2.mo) != 0)
        ; // no need to continue
    else if ((c = ts1.dy - ts2.dy) != 0)
        ; // no need to continue
    else if ((c = ts1.hr - ts2.hr) != 0)
        ; // no need to continue
```

timestmp.cpp 4

```
    else if ((c = ts1.mn - ts2.mn) != 0)
        ; // no need to continue
    else if ((c = ts1.sc - ts2.sc) != 0)
        ; // no need to continue
    return c;
}

// future time stamp

void TimeStamp::getpast(const int months)
{
    yr = now.yr;
    mo = now.mo - months;
    while (mo <= 0) {
        mo += 12;
        yr -= 1;
    }
    dy = now.dy;
    hr = now.hr;
    mn = now.mn;
    sc = now.sc;
}
```

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. In a computer system not utilizing a global database, but rather utilizing a collection of local databases, none of which serve as a central collection point, in which files are stored and modified at memory devices at multiple locations, apparatus for permitting the creation of new versions of a file at one location without knowledge of whether conflicting versions are created at another location, comprising:

a portable memory device transportable between locations on which a file version is stored; and, means for safely permitting reconciling different versions of a file transported from location to location on said portable memory device, said reconciling means including means at first and second locations for generating a log entry at its respective location, each of said log entries including a time stamp for the version of said file on said portable memory device at said location, said timestamp serving as a unique identifier regardless of the time indicated thereby, thus to create a history of version creation and modification for said file at said first and second locations;

means at said first location for entering said log entry into said portable memory device;

means at said second location for reading out the log entry on said portable memory device and for combining the log entry from said portable memory device and a log entry at said second location so as to compare both modified versions and respective timestamps to indentify missing entries or confliction updates represented by different timestamps and thus the existence of different versions of said file;

means at said second location and upon said identification of different versions of said file for determining actions necessary to synchronize said different versions; and, means at said second location for determining if such synchronizing action would result in loss of information, whereby combination of all versions of said file may be safely accomplished at said second location.

2. The apparatus of claim 1, and further including means for performing the determined synchronizing actions by copying or deleting files.

3. The apparatus of claim 2, and further including means for notifying the user if said synchronizing actions would result in loss of information.

4. The apparatus of claim 1, and further including means for purging obsolete log entries by purging a first entry if there exists a subsequent entry for the same file and if that subsequent entry is available at all other locations.

* * * * *